(12) United States Patent
Lopez et al.

(10) Patent No.: US 11,012,278 B2
(45) Date of Patent: May 18, 2021

(54) TECHNIQUE FOR NON-SINUSOIDAL RADIO COMMUNICATION

(71) Applicant: Telefonaktiebolaget LM Ericsson (publ), Stockholm (SE)

(72) Inventors: Miguel Lopez, Solna (SE); Leif Wilhelmsson, Lund (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 16/969,701

(22) PCT Filed: Mar. 1, 2018

(86) PCT No.: PCT/EP2018/055073
§ 371 (c)(1),
(2) Date: Aug. 13, 2020

(87) PCT Pub. No.: WO2019/166091
PCT Pub. Date: Sep. 6, 2019

(65) Prior Publication Data
US 2021/0006445 A1    Jan. 7, 2021

(51) Int. Cl.
*H04L 27/26* (2006.01)
*H04L 25/03* (2006.01)

(52) U.S. Cl.
CPC .... *H04L 27/2627* (2013.01); *H04L 25/03343* (2013.01); *H04L 27/2602* (2013.01); *H04L 27/2697* (2013.01)

(58) Field of Classification Search
CPC ........... H04L 27/2627; H04L 25/03343; H04L 27/2602; H04L 27/2697
See application file for complete search history.

(56) References Cited

U.S. PATENT DOCUMENTS 6,061,551 A * 5/2000 Sorrells ................... H04L 27/14
455/118
2013/0162401 A1    6/2013 Bae et al.

FOREIGN PATENT DOCUMENTS

WO    2011102662 A2    8/2011

OTHER PUBLICATIONS

3rd Generation Partnership Project, "3rd Generation Partnership Project; Technical Specification Group Radio Access Network; Evolved Universal Terrestrial Radio Access (E-UTRA); LTE Physical Layer; General Description (Release 14)", Technical Specification, 3GPP TS 36.201 V14.1.0, Mar. 1, 2017, pp. 1-15, 3GPP.

* cited by examiner

*Primary Examiner* — Rahel Guarino
(74) *Attorney, Agent, or Firm* — Coats + Bennett, PLLC

(57) ABSTRACT

A technique for transmitting data on carriers each using a non-sinusoidal waveform is described. As to a method aspect of the technique, a fundamental frequency (118) is assigned to each of the carriers using the non-sinusoidal waveform. Baseband frequencies corresponding to a set of harmonic components of the non-sinusoidal waveform at each of the assigned fundamental frequencies (118) are disjoint. An energy of each of the harmonic components in the set is greater than a predefined threshold value. Modulation symbols (116) representative of the data are transmitted on at least one or all of the carriers.

20 Claims, 15 Drawing Sheets

TECHNIQUE FOR NON-SINUSOIDAL RADIO COMMUNICATION

TECHNICAL FIELD

The present disclosure generally relates to a radio communication technique that is based on non-sinusoidal carriers. More specifically, methods and devices are provided for transmitting and receiving non-sinusoidal carriers.

BACKGROUND

Heinrich R. Hertz used spark discharge to produce the electromagnetic waves for his seminal experiments since 1886, which is an example of colored noise and on-off-keying (OOK). A strong incentive to use sinusoidal waves was provided by the need to operate several transmitters at the same time but to receive them selectively. The resonance of a circuit with coil and capacitor was implemented, among others, by Guglielmo Marconi according to British patent No. 7777 published in 1901 and Karl F. Braun since 1897. For more than a century, sinusoidal waves have become universal in radio communications.

Today, multicarrier modulation is widely used in wired and wireless communications. Currently, the most popular multicarrier technology is Orthogonal Frequency Division Multiplexing (OFDM), although non-orthogonal FDM techniques such as Filter Bank Multicarrier (FBMC) are the subject of active research.

While multicarrier modulation enables high data rates and high reliability, an increasing number of use cases, particularly in the context of connected device and the Internet of Things (IoT), has limited hardware resources and requires less power consumption than is necessary for conventional OFDM transmitters.

SUMMARY

Accordingly, there is a need for a technique that enables multicarrier radio communication with reduced resources, particularly reduced hardware and/or power consumption. Alternatively or in addition, there is a need for a radio communication technique that requires fewer resources and provides data rates or reliability comparable to OFDM or is compatible with OFDM.

As to one aspect, a method of transmitting data on carriers each using a non-sinusoidal waveform is provided. The method may comprise or trigger a step of assigning a fundamental frequency to each of the carriers using the non-sinusoidal waveform, wherein baseband frequencies corresponding to a set of harmonic components of the non-sinusoidal waveform at each of the assigned fundamental frequencies are disjoint. An energy of each of the harmonic components in the set may be greater than a predefined threshold value. Alternatively or in addition, the method may comprise or trigger a step of transmitting modulation symbols representative of the data on at least one or all of the carriers.

At least in some embodiments, by assigning the fundamental frequencies such that the harmonic components of the respective carrier do not interfere with the harmonic components of any other carrier, the non-sinusoidal waveform can be used by each of the carriers. In same or further embodiments, using the non-sinusoidal waveform can reduce hardware requirements and/or power consumption. For example, linear oscillators can be replaced by less complex (e.g., non-linear or switching) elements for generating the non-sinusoidal waveform. In same or further embodiments, a data rate or a reliability of a data communication may be improved by the set of harmonic components, particularly by using higher harmonic components in the set beyond the first harmonic component at the fundamental frequencies for modulation and demodulation in the data communication.

Implementations of the technique may provide multicarrier radio communication or may be compatible with orthogonal frequency multiplexing (OFDM, e.g., with a conventional OFDM receiver) and/or frequency division multiple access (FDMA). The technique may allocate the carriers in a multicarrier system by the assignment of the fundamental frequencies (e.g., as radio resources of the multicarrier system) to the carriers of a certain radio device. Alternatively or in addition, the technique may support backscattering in the transmission and/or may provide a passive Wi-Fi transmission of the data.

Each of the fundamental frequencies assigned to each of the carriers may be a center of frequency (e.g., a center of a baseband frequency and/or a center of a corresponding radio frequency) for the respective carrier. The assigning of the fundamental frequencies to the carriers may be implemented as a method of allocating carriers (also: subcarriers) out of a uniformly spaced frequency raster, e.g., OFDM subcarriers (i.e., on a subchannel raster or subcarrier raster) in an OFDM system or FDMA channel (i.e., on a channel raster) in an FDMA system.

For example, the non-sinusoidal waveform, such as a square wave, may be not mutually orthogonal in the sense of conventional OFDM, e.g., even if the non-sinusoidal waveform is transmitted at carriers whose fundamental frequencies belong to the uniformly spaced subcarrier raster. The reason for the lacking orthogonality may include a leakage of energy to adjacent frequencies, e.g., to the harmonic components in the set beyond the first harmonic at the respective fundamental frequency. The assignment of the fundamental frequencies so that the frequencies (e.g., baseband frequencies or resulting radio frequencies) corresponding to the set of harmonic components are disjoint can avoid that the energy leakage causes inter-channel interference (ICI). At least some embodiments can use the harmonic components in the set to improve the data communication, while a conventional arrangement on the subcarrier raster would cause severe performance degradations due to ICI. Alternatively or in addition, by virtue of the assignment of the fundamental frequency, the carriers can use the non-sinusoidal waveform with a minimum of ICI. Due to the assigned fundamental frequencies, most of the ICI can be removed. More specifically, the ICI may be controlled by the predefined threshold value. The minimum ICI may be defined by the threshold value. The greater the threshold value, the less may be the ICI.

The baseband frequencies of the harmonic components in the set applied to each of the assigned fundamental frequencies may be disjoint. The baseband frequencies of the harmonic components of the different carriers may be disjoint. All frequencies of the harmonic components in the set applied to all of the assigned fundamental frequencies may be pairwise distinct.

The technique may be implemented as a method of performing radio resource management (RRM). The RRM may be performed for multicarrier radio access and/or the carriers may be used for multicarrier radio access. The assigning may also be referred to as allocating.

The set of harmonic components applied to any one of the fundamental frequencies may include the corresponding fundamental frequency as the first harmonic component. The set of harmonic components applied to any one of the fundamental frequencies may further include one or more integer multiples of the corresponding fundamental frequency as the higher harmonic components. The set of harmonic components may comprise the first harmonic component and at least one higher harmonic component of the non-sinusoidal waveform. For example, the set of harmonic components may comprise the first harmonic component and the third harmonic component of the non-sinusoidal waveform. Since the energy of the harmonic components of the non-sinusoidal waveform may decrease (e.g., monotonically) with an index for the harmonic components, the set of harmonic components, for which the energy of each of the harmonic components in the set is greater than a predefined threshold value, may be a finite set.

The harmonic components may correspond to indices or terms of a Fourier series. The "energy" of any of the harmonic components may correspond to a square of the absolute value of a corresponding Fourier coefficient or a square of the absolute value of the corresponding term of the Fourier series. The "energy" of any of the harmonic components may also be referred to as the "power" of the corresponding harmonic component. For example, the "energy" may correspond to the "power" multiplied by a duration of the modulation symbol.

The carrier using the non-sinusoidal waveform may also be referred to as a non-sinusoidal carrier. The non-sinusoidal waveform may also be referred to as an anharmonic waveform. The carrier using the non-sinusoidal waveform may also be referred to as an anharmonic carrier.

Different modulation symbols may be transmitted on different carriers. The technique may be implemented as a method of performing multicarrier modulation (MCM). The data (e.g., a data stream) may be transmitted by splitting the data into several modulation symbols, e.g., each representing a substream having a bit rate less than a bit rate of the data stream. Each of the modulation symbols (e.g., each of the substreams) may be modulated on a different one of the carriers.

The multicarrier radio communication may be a non-sinusoidal (e.g., square wave) multicarrier radio communication. The technique may be implemented in a non-sinusoidal (e.g., square wave) multicarrier system. At least some receivers of the data communication may be OFDM receivers. The technique may be backward compatible with OFDM data reception.

The one method aspect may be implemented at one or more radio devices, e.g., in a multicarrier system. The one method aspect may be performed by the radio device, by each of the one or more radio devices or collectively by the radio devices.

The step of transmitting may comprise modulating the at least one carrier according at least one of a phase and an amplitude of the one or more modulation symbols to be transmitted on the respective carrier. The step of transmitting may comprise or initiate a substep of generating a baseband signal comprising the at least one carrier at the fundamental frequency assigned to the respective carrier. Alternatively or in addition, the step of transmitting may comprise or initiate a substep of modulating the at least one carrier according to the modulation symbols to be transmitted on the respective carrier. Each of the modulation symbols may define an amplitude and/or a phase applied to the respective carrier, e.g., for a quadrature amplitude modulation (QAM).

Alternatively or in addition, the technique may be implemented as a method of performing non-sinusoidal carrier-division access. Different transmitter embodiments or users may use disjoint subsets of the non-sinusoidal carriers (e.g., disjoint based on their fundamental frequencies) in the transmitting step. Analogously, different receiver embodiments or users may use disjoint subsets of the non-sinusoidal carriers in a receiving step.

The fundamental frequency may be generated or defined in the baseband. The non-sinusoidal waveform may be generated in the baseband and/or by a waveform generator. For example, each carrier may be generated by applying the assigned fundamental frequency to the waveform generator or one of a plurality of waveform generators, e.g., in a modulator. Generating a baseband signal may comprise adding the modulated waveforms at the respectively assigned fundamental frequency and/or power amplifying the modulated and/or added waveforms.

The modulator may modulate an impedance of an antenna according to the assigned fundamental frequencies.

The step of transmitting may comprise, for each of the at least one carrier used for the transmission, driving a non-sinusoidal signal generator for generating the non-sinusoidal waveform at the fundamental frequency assigned to the respective carrier and according to the one or more modulation symbols to be transmitted on the respective carrier. The non-sinusoidal signal generator may comprise a switch (e.g., a switching transistor), e.g., for generating a square wave.

Alternatively or in addition, the step of transmitting may comprise, for each of the at least one carrier used for the transmission, modulating an antenna circuit using the non-sinusoidal waveform at the fundamental frequency assigned to the respective carrier and according to the one or more modulation symbols to be transmitted on the respective carrier. The antenna circuit may comprise an impedance circuit configured to control an impedance of an antenna. The modulation symbols may be transmitted by backscattering an incident radio signal according to the modulation.

The method may further comprise a step of determining the set of harmonic components of the non-sinusoidal waveform so that the energy of each of the harmonic components in the set is greater than the predefined threshold value. The threshold value for the energy of each of the harmonic components in the set may be defined relative to an energy of the non-sinusoidal waveform or relative to an energy of the fundamental frequency of the non-sinusoidal waveform. The threshold value for the energy of the harmonic components may be a relative value, e.g., a value relative to a total energy of all harmonic components of the non-sinusoidal waveform. For example, the threshold value may correspond to a certain fraction or percentage of the energy of the non-sinusoidal waveform.

The fundamental frequency may correspond to the first harmonic component. Since the first harmonic component may be included in any set, an efficient representation of the set may be expressly indicative only of the higher harmonic components (i.e., higher than the first harmonic component).

Each harmonic component may correspond to at least one of an index, i, and a Fourier coefficient, $c_i$, of a Fourier series expansion. The Fourier series expansion may also be referred to as harmonic analysis. The index may be a natural number or a non-zero integer. Preferably, the non-sinusoidal waveform includes no direct current (DC) component or a zero mean value.

Alternatively or in addition, the Fourier coefficient $c_i$ may be a complex number. Fourier coefficients for a positive frequency component and a negative frequency component may be complex conjugated, $c_i = (c_{-i})^*$, for each harmonic component i. The harmonic component applied to the fundamental frequency $f_m$ may be represented by a term $c_i \cdot \exp(-2 \cdot \pi \cdot j \cdot i \cdot f_m \cdot t)$.

The non-sinusoidal waveform, WF, may correspond to a sum of the harmonic components according to $$WF(\tau) = \Sigma_i c_i \cdot \exp(-2 \cdot \pi \cdot j \cdot i \cdot \tau).$$

The non-sinusoidal waveform as used by the carrier assigned to the fundamental frequency $f_m$ may be represented by a frequency-scaled waveform according to $$\text{carrier}(t) = WF(f_m \cdot t).$$

Each harmonic component (i, $c_i$) may correspond to, or may be represented by, a natural number, i, and complex number, $c_i$. The baseband frequency, $i \cdot f_m$, resulting from applying the corresponding i-th harmonic component to the fundamental frequency $f_m$ may correspond to the fundamental frequency multiplied by the natural number.

The set of harmonic components may be represented or representable by a set of indices, $\{i_1, i_2, \ldots, i_{n\_max}\}$. The set of indices may be represented by a (e.g., ordered) list or vector of the indices. The indices may be positive integers. The first index may be $i_1=1$ corresponding to the fundamental frequency. The first index may be implied (e.g., not expressly encoded) in a format representing the set.

The step of determining the set may comprise or may be implemented by determining the number of n_max harmonic components depending on the threshold value. For example, the energy $|c_{i\_n}|^2$ may monotonically decrease for the sub-sequence $i_n$ (also symbolized by "i_n") as n increases. For example, $i_n = 2 \cdot n - 1$ for a waveform composed of odd harmonic components. The natural number n_max may be determined so that $|c_{i\_n}|^2$ is greater than the threshold value for n=n_max, and $|c_{i\_n}|^2$ is less than the threshold value for n=n_max+1.

The baseband frequencies corresponding to the set of harmonic components at each of the assigned fundamental frequencies, $f_1, f_2, \ldots, f_L$, may include the disjoint sets $\{f_1 \cdot i_1, f_1 \cdot i_2, \ldots, f_1 \cdot i_{n\_max}\}$, $\{f_2 \cdot i_1, f_2 \cdot i_2, \ldots, f_2 \cdot i_{n\_max}\}$, ..., $\{f_L \cdot i_1, f_L \cdot i_2, \ldots, f_L \cdot i_{n\_max}\}$.

The baseband frequency resulting from the i-th harmonic component of the non-sinusoidal waveform at the assigned fundamental frequency, $f_m$, may be $i \cdot f_m$. Baseband frequencies that differ by an integer multiple of a sampling frequency, $F_s$, (at the transmitter and/or the receiver) may be equivalent, e.g., in the assigning step.

Each of the assigned fundamental frequencies and/or each of the baseband frequencies may correspond to one of a plurality of subcarriers with subcarrier spacing $\Delta f$. The plurality of subcarriers may also be referred to as frequency resources or subcarrier raster. The subcarriers available for the assignment may be equally spaced in the frequency domain. The plurality of subcarriers may be arranged on a frequency raster with a common subcarrier spacing (SCS), $\Delta f$.

The modulation symbols may be transmitted within a bandwidth comprising N consecutive subcarriers. Baseband frequencies that differ by an integer multiple of $N \cdot \Delta f$ may be equivalent in the assigning step, i.e., for the disjointness condition.

The non-sinusoidal waveform may be a square wave or a triangle wave. The carrier using the square wave or a triangle wave may also be referred to as a square wave carrier or a triangle wave carrier, respectively.

The non-sinusoidal waveform may be composed of odd harmonic components. The set comprises odd harmonic components of the non-sinusoidal waveform. Herein, odd may refer to the indices of the Fourier series expansion being an odd integer.

The set may comprise the first harmonic component and the third harmonic component of the non-sinusoidal waveform. The set may be represented or representable by the indices $\{1, 3\}$ or $\{1, 3, \ldots\}$. If the first harmonic component, i.e., the fundamental frequency, is implied by the set, the set may be represented or representable by the index $\{3\}$ or indices $\{3, \ldots\}$.

None or at most one of the assigned fundamental frequencies may correspond to an index of the subcarriers that is a multiple of 3. None or at most one of the assigned fundamental frequencies may be a multiple of $3 \cdot \Delta f$.

Each of the carriers may be separately modulated, e.g., in the transmitting step. Each of the baseband frequencies or each of the corresponding subcarriers corresponding to the set of harmonic components at the assigned fundamental frequency of the carrier may be modulated according to the modulation symbol of the corresponding carrier.

At least one or each of the carriers may be phase-modulated. The phase modulation may include phase shift keying (PSK), e.g., quadrature PSK (QPSK) or 4-fold quadrature amplitude modulation (4-QAM).

The step of assigning may comprise transmitting or receiving a control message that is indicative of the assignment.

As to another aspect, a method of receiving data on carriers each using a non-sinusoidal waveform is provided. The method may comprise or trigger a step of assigning a fundamental frequency to each of the carriers using the non-sinusoidal waveform, wherein baseband frequencies corresponding to a set of harmonic components of the non-sinusoidal waveform at each of the assigned fundamental frequencies are disjoint. An energy of each of the harmonic components in the set may be greater than a predefined threshold value. Alternatively or in addition, the method may comprise or trigger a step of receiving modulation symbols representative of the data on at least one or all of the carriers.

Different modulation symbols may be received on different carriers. The technique may be implemented as a method of providing multicarrier radio access. The data (e.g., a data stream) may be received by combining several modulation symbols, e.g., each representing a substream having a bit rate less than a bit rate of the data stream. Each of the modulation symbols (e.g., each of the substreams) may be demodulated from a different one of the carriers.

The threshold requirement for the set may be a feature of the set for a given non-sinusoidal waveform, e.g., a square wave in which case the set comprises a certain number of odd harmonic components and no even harmonic components. That is, the set may comprise those harmonic components of a (e.g., hypothetical) harmonic analysis or harmonic representation of the non-sinusoidal waveform, the energy of which is greater than the threshold value. Hence, the set may be determined by the non-sinusoidal waveform and the threshold value. The set and/or the threshold requirement for the set may be the same for transmitter and receiver. For example, the set may be a configuration or feature of both a radio chain of the transmitter and a radio chain of the receiver. Alternatively or in addition, the set fulfilling the threshold requirement may be an implicit feature of the assignment of the fundamental frequencies and/or may underlie the assignment of the fundamental frequencies.

The set and/or the assignment may be a configuration of the transmitter and/or a configuration of the receiver. The configuration for the set and/or the assignment may be exchanged or shared between the transmitter and the receiver. The transmitter and the receiver may apply the same set and/or the same assignment. Preferably, the set and/or fulfilment of the threshold requirement for the set do not depend on a channel state of a radio channel between transmitter and receiver. That is, the threshold requirement for the set does not depend on frequency-selective fading or changes of gains in the subcarriers of the radio channel.

The step of receiving the modulation symbols may comprise sampling a received baseband signal with a sampling frequency, $F_s$. Baseband frequencies that differ by an integer multiple of the sampling frequency, $F_s$, may be equivalent in the assigning step, i.e., for the disjointness condition. In other words, baseband frequencies that differ by a multiple of $F_s$ may be indistinguishable and/or backfolded at the receiver.

Any baseband frequencies $i \cdot f_m$ and $i' \cdot f_m$ resulting from applying an i-th harmonic component and an i'-th harmonic component of the non-sinusoidal waveform to the fundamental frequency $f_m$ may be considered equivalent for the purpose of the assigning step, if $(i \cdot f_m - i' \cdot f_m)/F_s = f_m \cdot (i-i')/F_s$ is an integer (e.g., a positive integer or a negative integer). Equivalent baseband frequencies may correspond to the same OFDM subcarrier or frequency bin at the output of a Fourier transformation at the receiver. Mapping the baseband frequencies to the OFDM subcarriers or the output of the Fourier transformation may also be referred to as backfolding.

Furthermore, baseband frequencies corresponding to a positive frequency component and a negative frequency component may be considered equivalent for the purpose of the assigning step and/or the determining step. The positive frequency components and the negative frequency components may correspond to an upper sideband and a lower sideband, respectively, relative to the fundamental frequency (e.g., in a radio frequency signal or a baseband signal). The Fourier coefficient for the negative frequency component may be the complex conjugate of the Fourier coefficient for the corresponding positive frequency component. The energy for the negative frequency component may correspond to the energy for the corresponding positive frequency component.

Each of the assigned fundamental frequencies and/or each of the baseband frequencies corresponds to one of a plurality of subcarriers with subcarrier spacing $\Delta f$. The subcarriers may be labeled by an integer index k. The k-th subcarrier may correspond to a baseband frequency (e.g., one of the assigned fundamental frequencies) $k \cdot \Delta f$.

The non-sinusoidal carriers may be received using an orthogonal frequency-division multiplexing (OFDM) receiver and/or a Fourier transformation. Each of the non-sinusoidal carriers may be received based on one or more subcarriers corresponding to one or more of the harmonic components in the set for the respective carrier.

Baseband frequencies that differ by N subcarriers may be equivalent in the assigning step, wherein N may be the sampling frequency divided by the subcarrier spacing, $N = F_s/\Delta f$. The signal reception may distinguish N subcarriers, e.g., labeled 0 to N−1. Portions of the baseband signal outside of the bandwidth corresponding to the N subcarriers 0 to N−1 may be received as frequency-shifted by the sampling frequency onto the N subcarriers 0 to N−1. N may be (e.g., significantly) greater than 3.

Applying the i-th harmonic component of the non-sinusoidal waveform to a fundamental frequency $f_m$ corresponding to the subcarrier $k_m$ may result in a baseband frequency $i \cdot f_m$. As a result of the sampling frequency corresponding to a bandwidth comprising N subcarriers in the frequency domain, the baseband frequency $i \cdot f_m$ may correspond to the subcarrier $(i \cdot k_m \bmod N)$ in $[0, 1, \ldots, N-1]$. In the assigning step and/or the determining step, the baseband frequencies may be distinguished based on the corresponding one of the subcarriers $0, 1, \ldots, N-1$. The modulo operation (which may also be referred to as backfolding) may correspond to an undersampling of the non-sinusoidal waveform (e.g., an undersampling of higher harmonic components of the non-sinusoidal waveform).

As a result of the sampling frequency corresponding to a bandwidth comprising N subcarriers in the frequency domain (and optionally the symmetry of the Fourier coefficients of the harmonic components with respect to positive and negative frequencies), applying the harmonic components to a fundamental frequency $f_m$ corresponding to the subcarrier $k_m$ may result in the baseband frequencies $i \cdot f_m$ being mapped to, and/or distinguished based on, the subcarriers $0, \ldots, N-1$.

The baseband frequency corresponding to the i-th harmonic component of the non-sinusoidal waveform at the assigned fundamental frequency $f_m$ may be $\Delta f \cdot [(f_m \cdot i/\Delta f) \bmod N]$ or $\Delta f \cdot [\text{round}(f_m \cdot i/\Delta f) \bmod N]$. Alternatively or in addition, any baseband frequencies corresponding to subcarriers $i \cdot k_m$ and $i' \cdot k_m$ resulting from applying an i-th harmonic component and an i'-th harmonic component of the non-sinusoidal waveform to the subcarrier $k_m$ of the fundamental frequency $f_m$ may be considered equivalent for the purpose of the assigning step, if $(i \cdot k_m - i' \cdot k_m)/N = k_m \cdot (i-i')/N$ is an integer (e.g., a positive integer or a negative integer) or if $i \cdot k_m \bmod N = i' \cdot k_m \bmod N$.

Each of the fundamental frequencies, $f_m$, may correspond to one of the subcarriers, $k_m$. The subcarriers, $(k_m \cdot i_n) \bmod N$, for the baseband frequencies $f_m \cdot i_n$ corresponding to the harmonic components $i_n$ in the set $\{i_1, i_2, \ldots, i_{n\_max}\}$ at each of the assigned fundamental frequencies, $f_m$, may be disjoint. More specifically, in the assigning step, the subcarriers $$\{k_1 \cdot i_1 \bmod N, k_1 \cdot i_2 \bmod N, \ldots, k_1 \cdot i_{n\_max} \bmod N\},$$

$$\{k_2 \cdot i_1 \bmod N, k_2 \cdot i_2 \bmod N, \ldots, k_2 \cdot i_{n\_max} \bmod N\},$$

$$\ldots,$$

$$\{k_L \cdot i_1 \bmod N, k_L \cdot i_2 \bmod N, \ldots, k_L \cdot i_{n\_max} \bmod N\}$$

corresponding to the set, $\{i_1, i_2, \ldots, i_{n\_max}\}$, of harmonic components, $i_n$, at each of the assigned fundamental frequencies, $f_m$, may be disjoint.

In other words, the baseband frequencies outside of the bandwidth comprising the subcarriers 0 to N−1 of the baseband may be backfolded onto the subcarriers 0 to N−1 according to the modulo operation. The modulo operation may also map negative frequency components to the subcarriers 0 to N−1.

The fundamental frequency $f_m$ in the baseband may correspond to the $k_m$-th subcarrier. For example, the fundamental frequency may be $f_m = k_m \cdot \Delta f$ with the subcarrier spacing $\Delta f$.

At least one or each of the carriers may be phase-modulated. The receiving step may comprise demodulating the phase-modulated modulation symbol based on phase information received on both the assigned fundamental frequency of the corresponding carrier and at least one higher harmonic component in the set at the assigned fundamental frequency of the corresponding carrier. Herein, higher harmonic component may refer to any i-th harmonic component with i>1.

The at least one higher harmonic component may include an i-th harmonic component from the set. The phase modulation may comprise M different constellations (i.e., states) of the phase, wherein i and M are co-prime or incommensurable.

The step of assigning may comprise transmitting or receiving a control message that is indicative of the assignment. A control message indicative of the set of harmonic components and/or the assigned fundamental frequencies may be transmitted to one or more data transmitters (e.g., one or more radio devices) and/or received from the data transmitter (e.g., the radio device). The control message may configure and/or schedule the one or more radio devices to transmit on the carriers using the non-sinusoidal waveform. Control messages transmitted to different radio devices may be indicative of disjoint sets of fundamental frequencies and/or may fulfill the disjointness condition. Two or more carriers may be assigned to one or more radio devices. Any of the transmitters or radio devices may be a passive radio device, e.g., a radio device comprising an antenna without associated antenna amplifier.

The fundamental frequency may be defined in the baseband. A received radio signal may be down-converted. The multiple carriers may be sampled and/or demodulated after a common down-conversion of the received radio signal. The down-converted radio signal may also be referred to as a received baseband signal.

The other method aspect may be implemented at another radio device or a base station, e.g., of a radio access network (RAN). The other method aspect may be performed by the other radio device or the base station.

The other method aspect may further comprise any feature or step disclosed in the context of the one method aspect, or a feature or a step corresponding to the one method aspect.

The one method aspect may also be referred to as the transmitting method aspect. The other method aspect may also be referred to as the receiving method aspect. At least some transmitting embodiments and receiving embodiments of the technique may be distinguished by the arrangement of the assigned fundamental frequencies fulfilling the condition of disjoint (also: non-overlapping) frequencies (e.g., disjoint baseband frequencies and/or disjoint radio frequencies) corresponding to the harmonic components in the set.

In any aspect, a radio device may encompass a station that is configured to wirelessly access a base station or wirelessly communicate with another radio device. The radio device may be configured for peer-to-peer communication (e.g., on a sidelink) and/or for accessing the RAN (e.g. an UL and/or downlink, DL). The radio device may be a user equipment (UE, e.g., a 3GPP UE), a mobile or portable station (STA, e.g. a Wi-Fi STA), a device for machine-type communication (MTC) or a combination thereof. Examples for the UE and the mobile station include a mobile phone and a tablet computer. Examples for the portable station include a laptop computer and a television set. Examples for the MTC device include robots, sensors and/or actuators, e.g., in manufacturing, automotive communication and home automation. The MTC device may be implemented in household appliances and consumer electronics. Examples for the combination include a self-driving vehicle, a door intercommunication system and an automated teller machine.

In any aspect, a base station may encompass a station that is configured to provide radio access to one or more radio devices. Examples for the base station may include a 3G base station or Node B, 4G base station or eNodeB, a 5G base station or gNodeB, an access point (e.g., a Wi-Fi access point) and a network controller (e.g., according to Bluetooth, ZigBee or Z-Wave).

The RAN may be implemented according to the Global System for Mobile Communications (GSM), the Universal Mobile Telecommunications System (UMTS), Long Term Evolution (LTE) and/or New Radio (NR).

The technique may be implemented on a Physical Layer (PHY), a Medium Access Control (MAC) layer, a Radio Link Control (RLC) layer and/or a Radio Resource Control (RRC) layer of a protocol stack for the radio communication.

As to another aspect, a computer program product is provided. The computer program product comprises program code portions for performing any one of the steps of the method aspects disclosed herein when the computer program product is executed by one or more computing devices. The computer program product may be stored on a computer-readable recording medium. The computer program product may also be provided for download via a data network, e.g., via the RAN and/or via the Internet and/or by the base station. Alternatively or in addition, the method may be encoded in a Field-Programmable Gate Array (FPGA) and/or an Application-Specific Integrated Circuit (ASIC), or the functionality may be provided for download by means of a hardware description language.

As to one device aspect, a device for transmitting data on carriers each using a non-sinusoidal waveform is provided. The device is configured to perform the one method aspect. Alternatively or in addition, the device may comprise an assigning unit configured to assign a fundamental frequency to each of the carriers using the non-sinusoidal waveform. Baseband frequencies corresponding to a set of harmonic components of the non-sinusoidal waveform at each of the assigned fundamental frequencies may be disjoint. An energy of each of the harmonic components in the set may be greater than a predefined threshold value. The device may further comprise a transmitting unit configured to transmit modulation symbols representative of the data on at least one or all of the carriers.

As to another device aspect, a device for receiving data on carriers each using a non-sinusoidal waveform is provided. The device is configured to perform the other method aspect. Alternatively or in addition, the device may comprise an assigning unit configured to assign a fundamental frequency to each of the carriers using the non-sinusoidal waveform. Baseband frequencies corresponding to a set of harmonic components of the non-sinusoidal waveform at each of the assigned fundamental frequencies may be disjoint. An energy of each of the harmonic components in the set may be greater than a predefined threshold value. The device may further comprise a receiving unit configured to receive modulation symbols representative of the data on at least one or all of the carriers.

As to a further device aspect, a device for transmitting data on carriers each using a non-sinusoidal waveform is provided. The device comprises at least one processor and a memory. Said memory comprises instructions executable by said at least one processor whereby the device may be operative to assign a fundamental frequency to each of the carriers using the non-sinusoidal waveform. Baseband frequencies corresponding to a set of harmonic components of the non-sinusoidal waveform at each of the assigned fundamental frequencies may be disjoint. An energy of each of the harmonic components in the set may be greater than a predefined threshold value. Execution of the instructions may further cause the device to be operative to transmit modulation symbols representative of the data on at least one or all of the carriers.

As to a further device aspect, a device for receiving data on carriers each using a non-sinusoidal waveform is provided. The device comprises at least one processor and a memory. Said memory comprises instructions executable by said at least one processor whereby the device may be operative to assign a fundamental frequency to each of the carriers using the non-sinusoidal waveform. Baseband frequencies corresponding to a set of harmonic components of the non-sinusoidal waveform at each of the assigned fundamental frequencies may be disjoint. An energy of each of the harmonic components in the set may be greater than a predefined threshold value. Execution of the instructions may further cause the device to be operative to receive modulation symbols representative of the data on at least one or all of the carriers.

As to a still further aspect, a user equipment (UE) configured to communicate with a base station is provided. The UE comprises a radio interface and processing circuitry configured to execute the any one of the steps of the method aspect.

As to a still further aspect a communication system including a host computer is provided. The host computer may comprise a processing circuitry configured to provide user data. The host computer may further comprise a communication interface configured to forward user data to a cellular network for transmission to a user equipment (UE), wherein the UE comprises a radio interface and processing circuitry, the processing circuitry of the UE being configured to execute any one of the steps of the method aspect.

The communication system may further include the UE. Alternatively or in addition, the cellular network may further include a base station configured to communicate with the UE.

The processing circuitry of the host computer may be configured to execute a host application, thereby providing the user data. Alternatively or in addition, the processing circuitry of the UE may be configured to execute a client application associated with the host application.

As to a still further aspect a method implemented in a user equipment (UE) is provided. The method may comprise any of the steps of the method aspect.

The devices, the UE, the base station, the system or any node or station for embodying the technique may further include any feature disclosed in the context of the method aspect, and vice versa. Particularly, any one of the units and modules, or a dedicated unit or module, may be configured to perform or initiate one or more of the steps of any one of the method aspect.

BRIEF DESCRIPTION OF THE DRAWINGS

Further details of embodiments of the technique are described with reference to the enclosed drawings, wherein.

DETAILED DESCRIPTION

In the following description, for purposes of explanation and not limitation, specific details are set forth, such as a specific network environment in order to provide a thorough understanding of the technique disclosed herein. It will be apparent to one skilled in the art that the technique may be practiced in other embodiments that depart from these specific details. Moreover, while the following embodiments are primarily described for a 5G New Radio (NR) implementation, it is readily apparent that the technique described herein may also be implemented in any other radio network, including 3GPP LTE or a successor thereof, Wireless Local Area Network (WLAN) according to the standard family IEEE 802.11, Bluetooth according to the Bluetooth Special Interest Group (SIG), particularly Bluetooth Low Energy (BLE) and Bluetooth broadcasting, Z-Wave and/or ZigBee based on IEEE 802.15.4.

Moreover, those skilled in the art will appreciate that the functions, steps, units and modules explained herein may be implemented using software functioning in conjunction with a programmed microprocessor, an Application Specific Integrated Circuit (ASIC), a Field Programmable Gate Array (FPGA), a Digital Signal Processor (DSP) or a general purpose computer, e.g., including an Advanced RISC Machine (ARM). It will also be appreciated that, while the following embodiments are primarily described in context with methods and devices, the invention may also be embodied in a computer program product as well as in a system comprising at least one computer processor and memory coupled to the at least one processor, wherein the memory is encoded with one or more programs that may perform the functions and steps or implement the units and modules disclosed herein.

Figure 1:
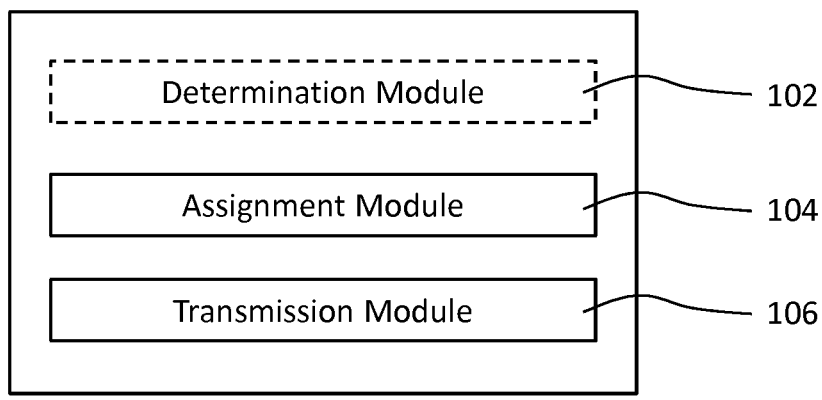
FIG. 1 shows a schematic block diagram of a device for transmitting data on carriers each using a non-sinusoidal waveform.

FIG. 1 schematically illustrates a block diagram of a device for transmitting data on carriers each using a non-sinusoidal waveform. The device is generically referred to by reference sign 100.

The device 100 comprises an assignment module 104 that assigns a fundamental frequency to each of the carriers using the non-sinusoidal waveform. Baseband frequencies corresponding to a set of harmonic components of the non-sinusoidal waveform at each of the assigned fundamental frequencies are disjoint, wherein an energy of each of the harmonic components in the set is greater than a predefined threshold value. The device 100 further comprises a transmission module 106 that transmits modulation symbols representative of the data on at least one or all of the carriers.

The assignment of the fundamental frequencies fulfills the condition that the baseband frequencies corresponding to the set of harmonic components of the non-sinusoidal waveform at each of the assigned fundamental frequencies are disjoint. This condition is also referred to as disjointness condition or non-overlapping condition.

The assignment of the fundamental frequencies may be received from a controller (e.g., a radio resource controller) outside of the device 100 and/or a recipient of the data transmission. Alternatively or in combination, the assignment may be generated or derived at the device 100, e.g., based on scanning potential subcarriers for availability (e.g., in the absence of energy) or occupancy (e.g., by measuring energy on the respective subcarriers).

Optionally, the device 100 comprises a determination module 102 that determines the set of harmonic components of the non-sinusoidal waveform so that the energy of each of the harmonic components in the set is greater than a predefined threshold value. For example, the set is retrieved from a memory of the device 100. The set stored in the memory may be predefined by a communication standard. Alternatively or in addition, the set is received at the device 100, e.g., from the recipient of the data transmission.

The device 100 may be connected to and/or implemented by a radio device. The radio device may be a stationary, mobile, wearable or implantable device.

Any of the modules of the device 100 may be implemented by units configured to provide the corresponding functionality.

Figure 2:
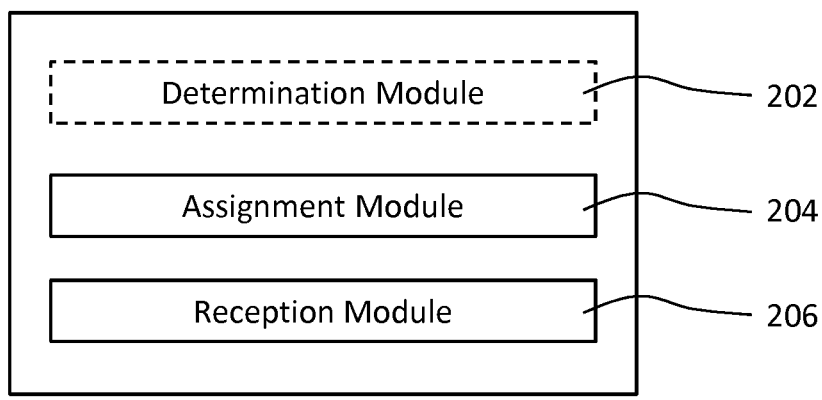
FIG. 2 shows a schematic block diagram of a device for receiving data on carriers each using a non-sinusoidal waveform.

FIG. 2 schematically illustrates a block diagram of a device for receiving data on carriers each using a non-sinusoidal waveform. The device is generically referred to by reference sign 200.

The device 200 comprises an assignment module 204 that assigns a fundamental frequency to each of the carriers using the non-sinusoidal waveform. Baseband frequencies corresponding to a set of harmonic components of the non-sinusoidal waveform at each of the assigned fundamental frequencies are disjoint, wherein an energy of each of the harmonic components in the set is greater than a predefined threshold value. The device 200 further comprises a reception module 206 that receives modulation symbols representative of the data on at least one or all of the carriers.

The assignment of the fundamental frequency fulfills the condition that the baseband frequencies corresponding to the set of harmonic components of the non-sinusoidal waveform at each of the assigned fundamental frequencies are disjoint. The assignment may be transmitted from the device 200 and/or to a transmitter of the data. Alternatively or in combination, the assignment may be generated or derived at the device 200, e.g., based on scanning potential subcarriers for availability (e.g., in the absence of energy) or occupancy (e.g., by measuring energy on the respective subcarriers).

Optionally, the device 200 comprises a determination module 202 that determines the set of harmonic components of the non-sinusoidal waveform so that the energy of each of the harmonic components in the set is greater than a predefined threshold value. For example, the set is retrieved from a memory of the device 200. The set stored in the memory may be predefined by a communication standard. Alternatively or in addition, the set is transmitted from the device 200, e.g., to the transmitter of the data.

The device 200 may be connected to and/or implemented by another radio device or a base station.

Herein, the base station may be configured to provide radio access to one or more radio devices (e.g., including one or more embodiments of the device 100). The base station may be part of a radio access network (RAN) and/or may be a radio resource controller and/or scheduler (e.g., for the RAN or a cell of the RAN). The base station may encompass a network controller (e.g., a Wi-Fi access point) or a radio access node (e.g., a 3G Node B, a 4G eNodeB or a 5G gNodeB) of the RAN.

The one or more radio devices may be configured to access the base station. Alternatively or in addition, two or more radio devices (e.g., including embodiments of the devices 100 and 200) may be configured to wirelessly connect to each other, e.g., in an ad-hoc radio network or via 3GPP sidelinks.

The one or more radio devices (e.g., including embodiments of the devices 100 and 200) may include mobile or portable stations and/or user equipments (UEs). The radio device (e.g., an embodiment of the device 100) may be a device for machine-type communication (MTC) and/or Internet of Things (IoT), particularly narrowband IoT (NB-IoT). The radio device (e.g., an embodiment of the device 100) may be a microbot, e.g., for configured to swim in blood vessels, a sensor for home automation or a device for radio-frequency identification (RFID).

Figure 3:
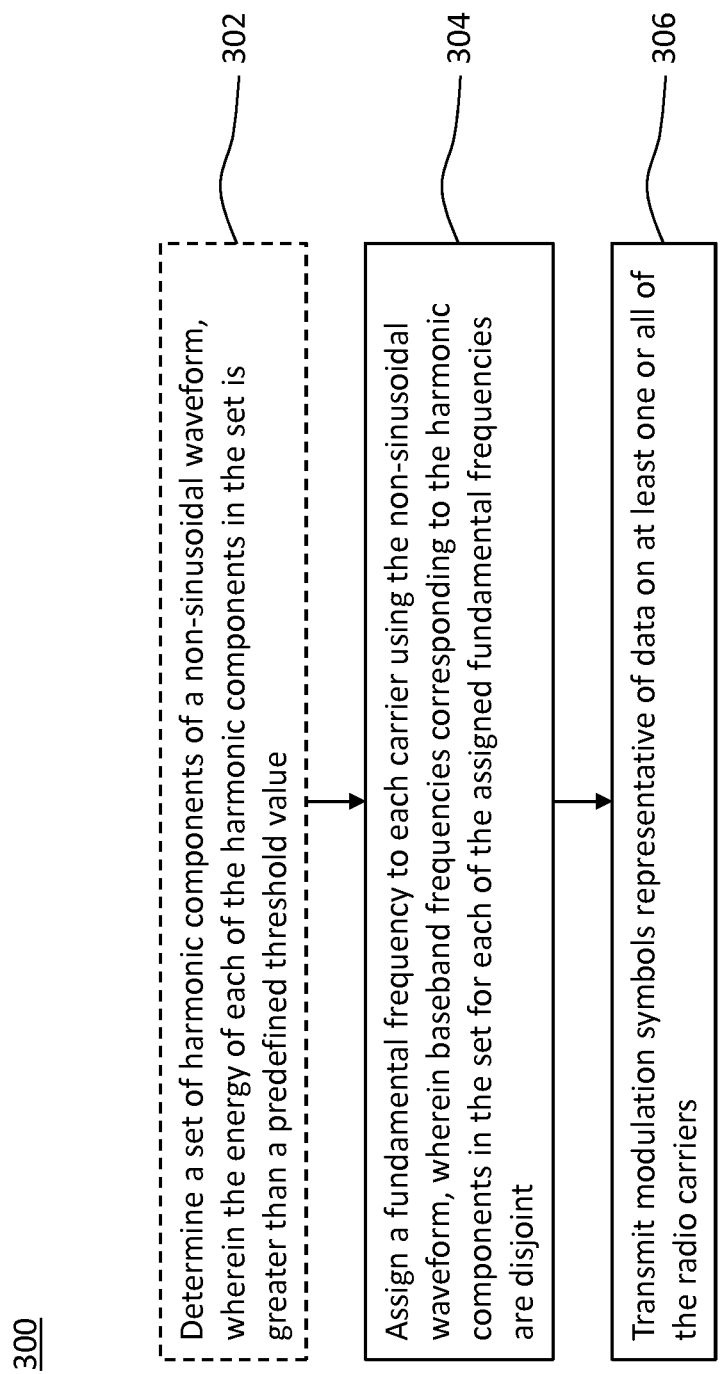
FIG. 3 shows a flowchart for a method of transmitting data on carriers each using a non-sinusoidal waveform, which is implementable by the device of FIG. 1.

FIG. 3 shows a flowchart for a method 300 of transmitting data on carriers each using a non-sinusoidal waveform. The method comprises a step 304 of assigning a fundamental frequency to each of the carriers using the non-sinusoidal waveform, wherein baseband frequencies corresponding to a set of harmonic components of the non-sinusoidal waveform at each of the assigned fundamental frequencies are disjoint. An energy of each of the harmonic components in the set is greater than a predefined threshold value. Modulation symbols representative of the data are transmitted on at least one or all of the carriers in a step 306.

Optionally, the method 300 comprises a step 302 of determining the set of harmonic components of the non-sinusoidal waveform so that the energy of each of the harmonic components in the set is greater than the predefined threshold value. In the step 302, the set may be retrieved from local memory or received, e.g., from a recipient of the data transmission.

The method 300 may be performed by the device 100, e.g., by (or by controlling) the radio device. For example, the modules 102, 104 and 106 may perform the steps 202, 204 and 206, respectively.

Figure 4:
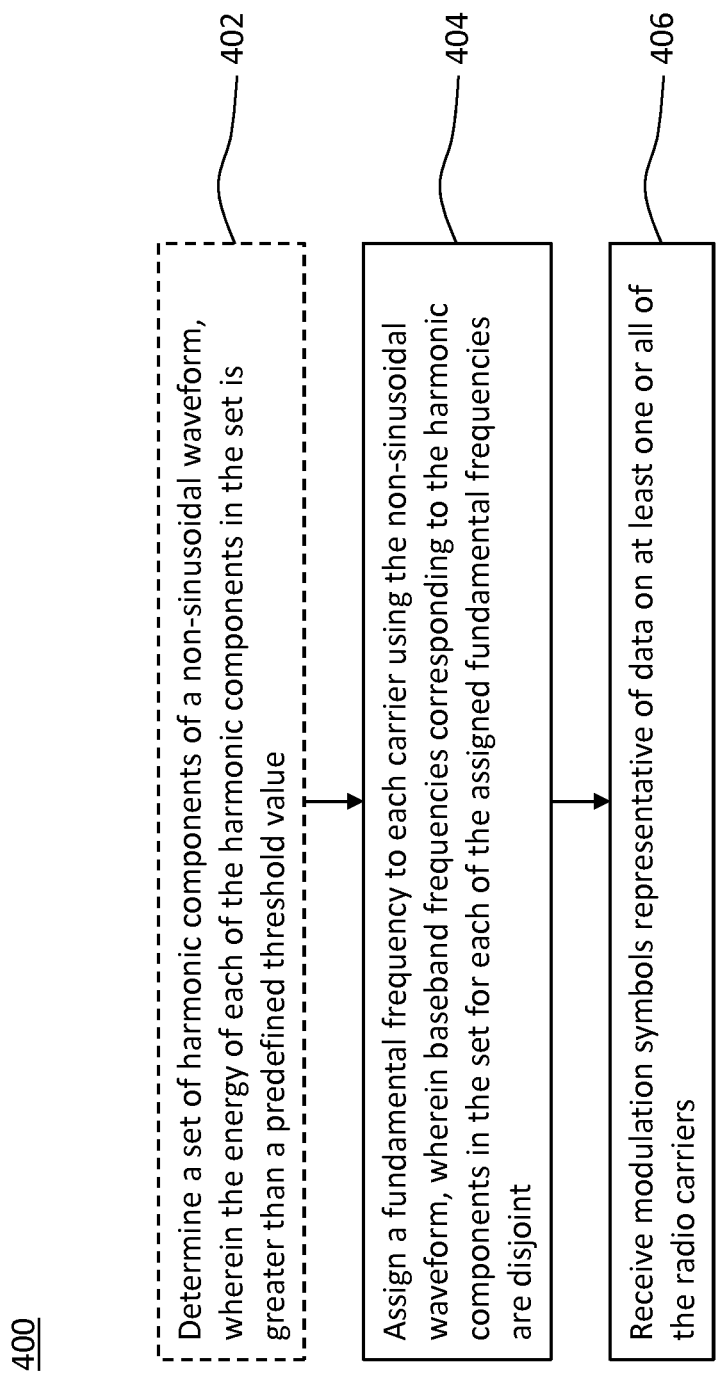
FIG. 4 shows a flowchart for a method of receiving data on carriers each using a non-sinusoidal waveform, which is implementable by the device of FIG. 2.

FIG. 4 shows a flowchart for a method 400 of receiving data on carriers each using a non-sinusoidal waveform. The method comprises a step 404 of assigning a fundamental frequency to each of the carriers using the non-sinusoidal waveform, wherein baseband frequencies corresponding to a set of harmonic components of the non-sinusoidal waveform at each of the assigned fundamental frequencies are disjoint. An energy of each of the harmonic components in the set is greater than a predefined threshold value. Modulation symbols representative of the data are received on at least one or all of the carriers in a step 406.

Optionally, the method 400 comprises a step 402 of determining the set of harmonic components of the non-sinusoidal waveform so that the energy of each of the harmonic components in the set is greater than the predefined threshold value. In the step 402, the set may be retrieved from local memory or transmitted, e.g., to a transmitter of the data.

The method 400 may be performed by the device 200, e.g., by (or by controlling) the other radio device or the base station. For example, the modules 202, 204 and 206 may perform the steps 402, 404 and 406, respectively.

Embodiments of the technique may be compatibility with 3GPP NB-IoT, e.g., according to the document 3GPP TS 36.201, Version 14.1.0.

In any embodiment, each of the carriers may comprise a fundamental frequency (also: carrier frequency or subcarrier index), a non-sinusoidal waveform and one or more carrier features subjected to the modulation, e.g., phase, amplitude and frequency. Each of the carriers may be identified or identifiable based on the assigned fundamental frequency, which may also be referred to as carrier frequency. Furthermore, the expressions "carrier" and "fundamental frequency" may be used interchangeably.

Figure 5:
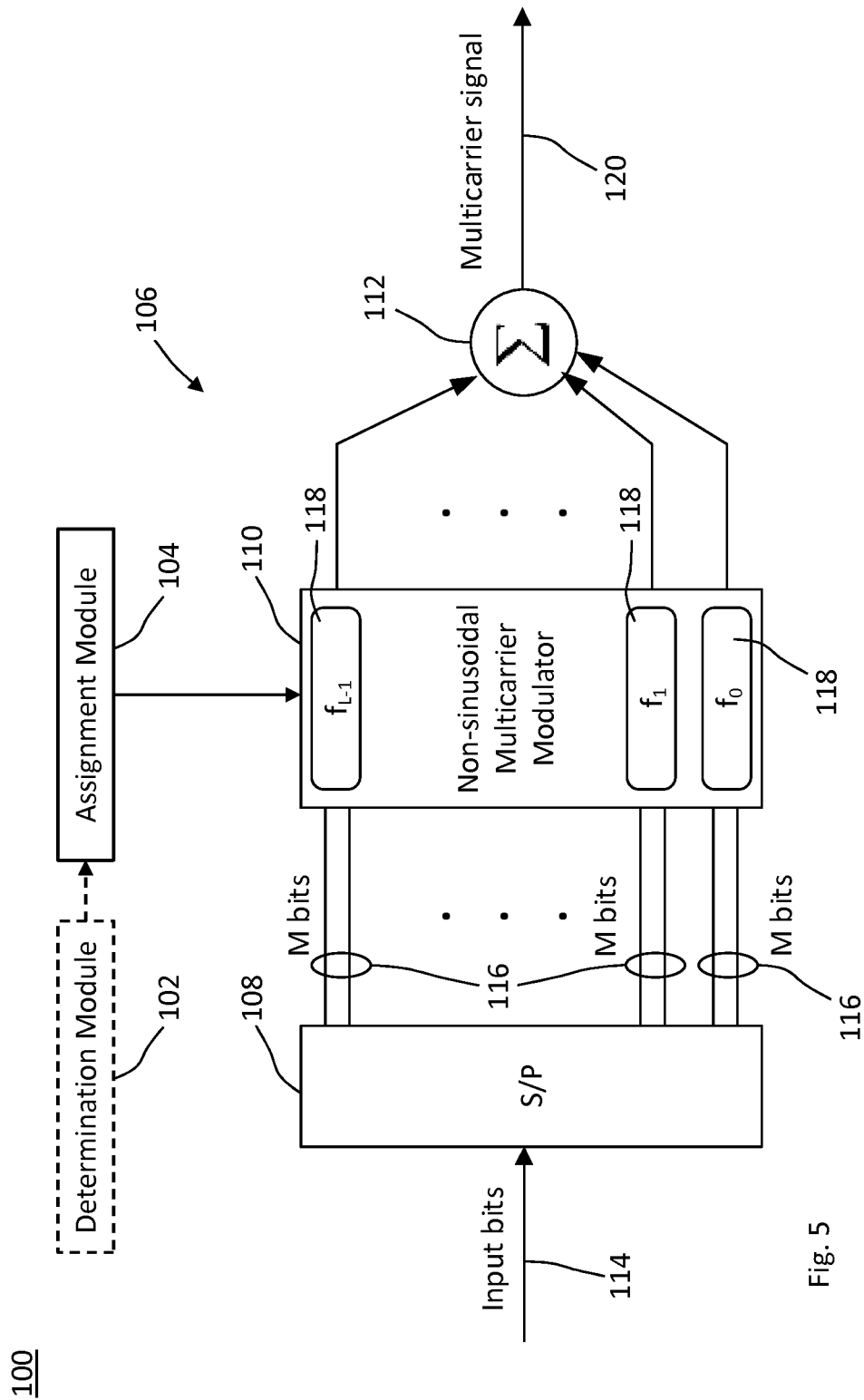
FIG. 5 shows a schematic block diagram of a first embodiment of the device of FIG. 1.

FIG. 5 shows a schematic block diagram for an embodiment of the device 100. Same or corresponding features, as described for the transmitting embodiment of FIG. 5, may be implemented in a receiving embodiment of the device 200.

The transmission module 106 comprises a serial-to-parallel (S/P) converter 108 and a modulator module 110, which may also be referred to as a non-sinusoidal multicarrier modulator 110. The modulator module 110 comprises a plurality of non-sinusoidal modulators. The modulator module 110 comprises for each of the non-sinusoidal carriers at least one of the non-sinusoidal modulators. Each of the non-sinusoidal modulators is configured to generate, for the corresponding non-sinusoidal carrier, a carrier component of a baseband signal 120 in the time domain. The carrier components of the baseband signal 120 are combined by a signal combiner 112.

For each of the non-sinusoidal carriers, at least one of the non-sinusoidal modulators is operated at the respectively assigned fundamental frequency 118. The resulting carrier component of the baseband signal 120 comprises the non-sinusoidal waveform at the respectively assigned fundamental frequency. Furthermore, the waveform is modulated, i.e., the amplitude and/or the phase of the waveform in the carrier component corresponds to the respective modulation symbol 116.

The modulation symbols 116 represent data 114 to be transmitted. The data 114 is transmitted according to the step 306 by applying the baseband signal 120 to an antenna of the device 100.

In one variant of any embodiment, the device 100 is an active radio device or a base station. The device 100 may comprise an up-converter for generating a radio frequency signal based on the baseband signal 120. The radio frequency signal comprises the baseband signal 120 shifted to a radio frequency. Alternatively or in addition, the device 100 may comprise a power amplifier (PA) for amplifying the radio frequency signal before it is applied to the antenna in the step 306.

In a second variant of any embodiment, which is combinable with the first variant, the device 100 is a passive radio device. The device 100 may comprise an impedance modulating circuit that is coupled to the antenna of the device 100. An impedance of the antenna may be modulated according to the baseband signal 120 in the step 306. The impedance modulation may backscatter an incident radio signal that is incident to the antenna of the device 100, wherein the backscattered radio signal is modulated according to the baseband signal 120.

In any variant, the antenna at the device 100 may comprise multiple antenna elements, e.g., an antenna array for beamforming and/or pairs of orthogonally polarized antenna elements. The device 100 may comprise a corresponding number of modulator modules 110 and/or signal combiners 112 each coupled to one of the antenna elements. Alternatively or in addition, the antenna elements may be clustered into two or more clusters. Each cluster may comprise analog phase shifters for the antenna elements in the corresponding cluster. The phase shifters may be controlled for the beamforming. The device 100 may comprise a corresponding number of modulator modules 110 and/or signal combiners 112 each coupled to a different one of the clusters.

Based on the data 114 to be transmitted, the S/P converter 108 defines the modulation symbols 116 according to which the non-sinusoidal multicarrier modulator 110 modulates the non-sinusoidal waveform of the respective carrier. The data 114 to be transmitted (i.e., the data bits to be transmitted, e.g., an input bit-stream) is converted to parallel streams at a lower rate by the S/P converter 108. Groups of M bits in each of the parallel streams define the modulation symbols 116 and are used to modulate the multiple non-sinusoidal carriers. In terminological analogy to sinusoidal subcarriers in an orthogonal frequency-division multiple (OFDM) transmitter, the non-sinusoidal carriers may also be referred to as non-sinusoidal subcarriers.

The device 100 uses L non-sinusoidal carriers, each being assigned a fundamental frequency 118 symbolized by $f_k$ for $k=0, \ldots, L-1$. A non-sinusoidal multicarrier signal, i.e., the baseband signal 120 generated by the modulator module 110, is obtained by adding all the individually modulated non-sinusoidal carriers, i.e., the carrier components of the baseband signal 120, at the signal combiner 112.

While a transmission aspect of the technique has been described above for an embodiment of the device 100, the non-sinusoidal modulators described for the embodiment in FIG. 5 may also be physically distributed over several wireless nodes, each being a further embodiment of the device 100. For example, in a radio communication system comprising at least two embodiments of the device 100 (e.g., different wireless nodes each configured to perform the method 300), the different embodiments of the device 100 are assigned (or allocated) non-overlapping subsets of the fundamental frequencies $f_k$.

For example, the disjointness condition that the baseband frequencies corresponding to the set of harmonic components of the non-sinusoidal waveform at each of the assigned fundamental frequencies are disjoint, is fulfilled for each embodiment of the device 100 in the radio communication system. Optionally, the fundamental frequencies assigned to different embodiments of the device 100 (e.g., in the same radio communication system and/or the same frequency band) are different. Further optionally, the disjointness condition is fulfilled for the radio communication system. That is, the baseband frequencies corresponding to the set of harmonic components of the non-sinusoidal waveform at the fundamental frequencies assigned to all embodiments of the device 100 (e.g., in the same radio communication system and/or the same frequency band) are disjoint.

The technique may be implemented in an orthogonal frequency-division multiple access (OFDMA) radio communication system. Each of the baseband frequencies may correspond to an OFDM subcarrier of the OFDMA radio communication system. The disjointness condition may require that the OFDM subcarriers corresponding to the set of harmonic components of the non-sinusoidal waveform at each of the assigned fundamental frequencies are disjoint. The disjointness condition may be fulfilled for each embodiment of the device 100 in the OFDMA radio communication system. Optionally, the fundamental frequencies assigned to different embodiments of the device 100 in the same OFDMA radio communication system correspond to different OFDM subcarriers. That is, fundamental frequencies $f_k$ assigned to different embodiments of the device 100 are non-overlapping subsets of the available subcarriers in the OFDMA system. Further optionally, the disjointness condition is fulfilled for the OFDMA radio communication system. That is, the OFDM subcarriers corresponding to the set of harmonic components of the non-sinusoidal waveform at the fundamental frequencies assigned to all embodiments of the device 100 in the same OFDMA radio communication system are disjoint.

Alternatively or in addition, in case the technique is implemented in an OFDMA radio communication system, some of the OFDM subcarriers of the OFDMA radio communication system are allocated to embodiments of the technique in coexistence with other radio devices and/or base stations that use sinusoidal OFDM subcarriers for their radio communication.

In any embodiment, the (e.g., individual) modulating of the non-sinusoidal carriers in the step 306 (and/or a corresponding demodulation) may be implemented by keying or digital modulation. Each of the modulation symbols may correspond to a discrete state, e.g., in a constellation diagram (for modulating the phase and/or the amplitude of the respective carrier) or in a frequency domain (for modulating the frequency of the respective carrier).

Each group of bits 116 defines a modulation symbol, e.g., according to frequency-shift keying (FSK), on-off-keying (OOK), phase-shift keying (PSK), particularly binary phase-shift keying (BPSK), quadrature phase-shift keying (QPSK), M-ary phase shift keying (M-PSK) or M-ary Quadrature Amplitude Modulation (M-QAM). The number of M discrete states for the modulation may be M=8 or any power of two. For frequency-shift keying (FSK), the fundamental frequency 118 may be shifted for the respective carrier according to the respective modulation symbol 116, e.g., within the frequency limits of a subcarrier spacing (SCS) or an integer fraction of the SCS. The integer of the integer fraction may correspond to the greatest index (i.e., the greatest multiplier) of the harmonic components in the set.

In any embodiment, the non-sinusoidal waveform may comprise a square wave and/or a triangle wave. For example, each of the non-sinusoidal carriers corresponds to a square wave at the respectively assigned fundamental frequency.

The non-sinusoidal carriers are also referred to as carries for brevity. Furthermore, since each carrier is assigned a fundamental frequency 118, the carriers may also be referred to by reference sign 118. Moreover, different carriers 118 may be assigned the same fundamental frequency, wherein the different carriers 118 are distinguished by the combination of at least one of fundamental frequency, polarization and beamforming (e.g., by means of precoding).

Figure 6:
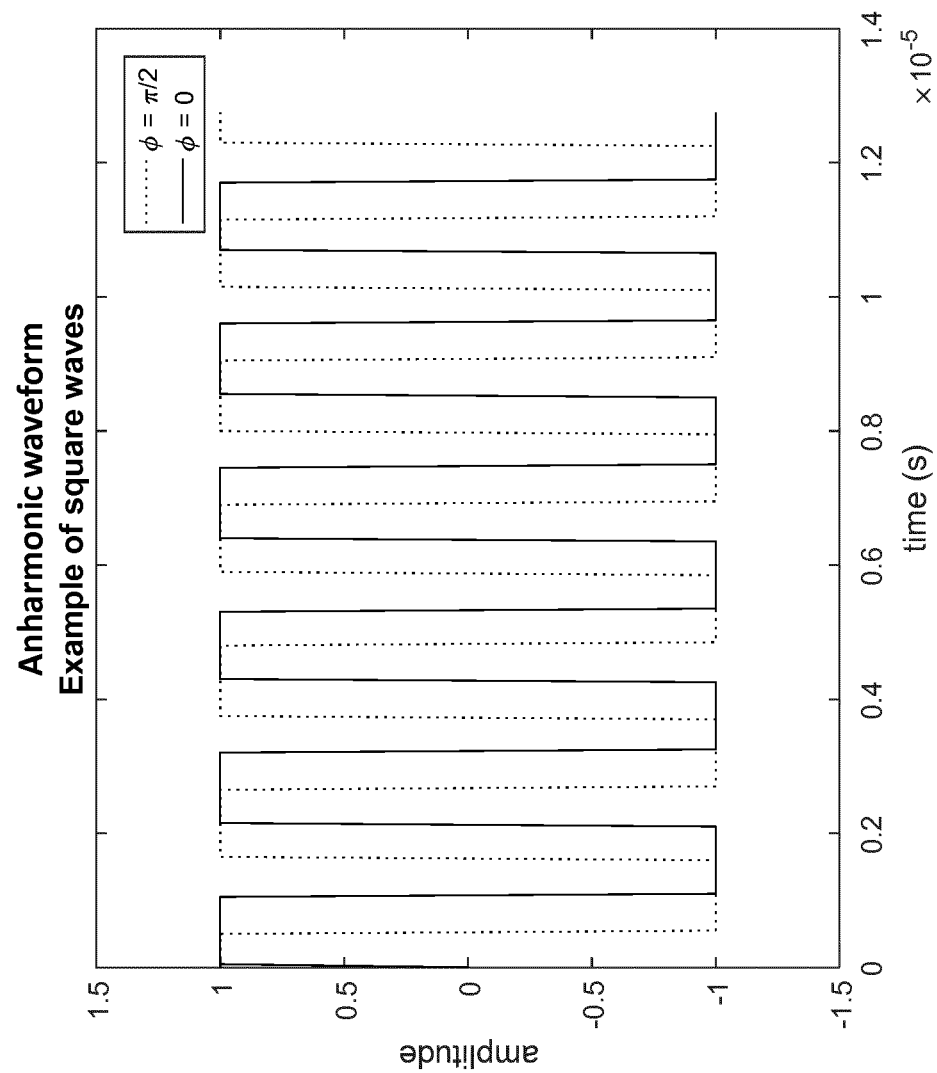
FIG. 6 schematically illustrates a square wave as an example of a non-sinusoidal waveform.
Figure 7A:
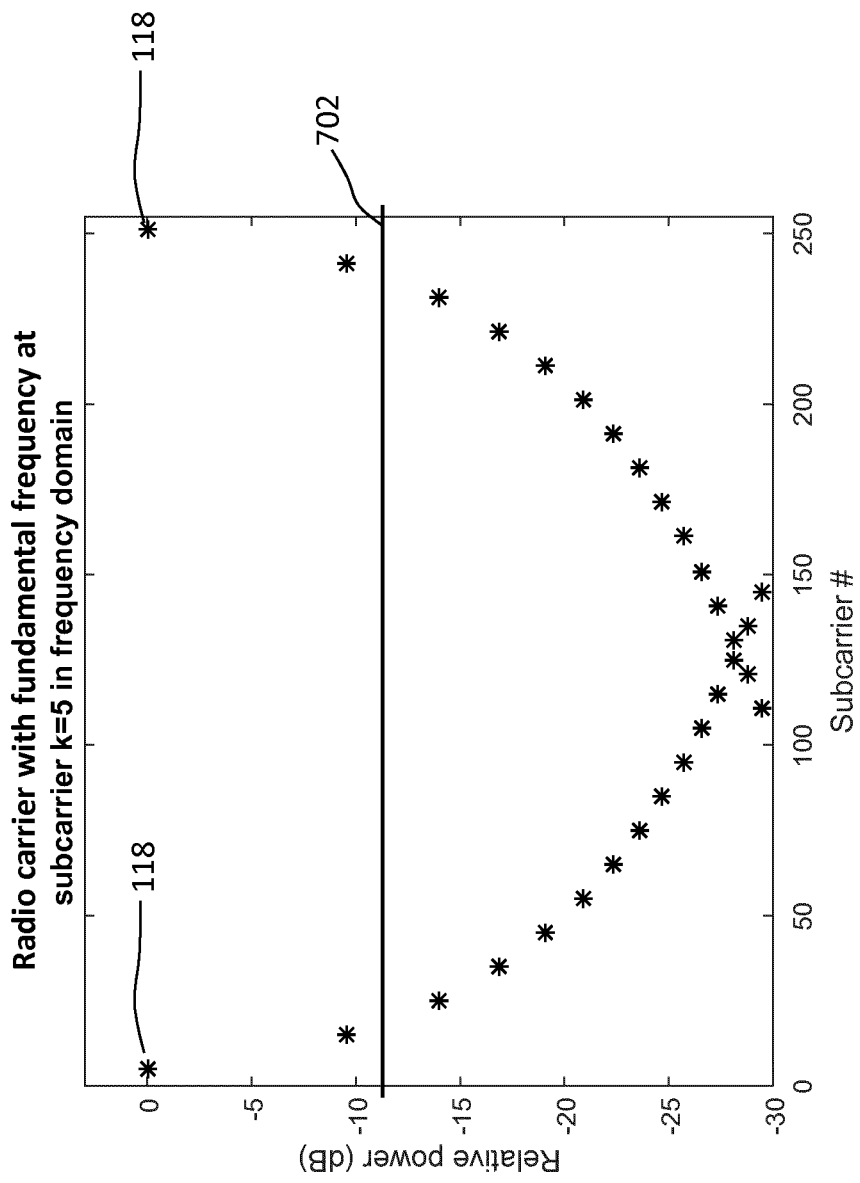
FIGS. 7A to 7D schematically illustrate baseband frequencies corresponding to a set of harmonic components of the non-sinusoidal waveform at different fundamental frequencies.
Figure 7B:
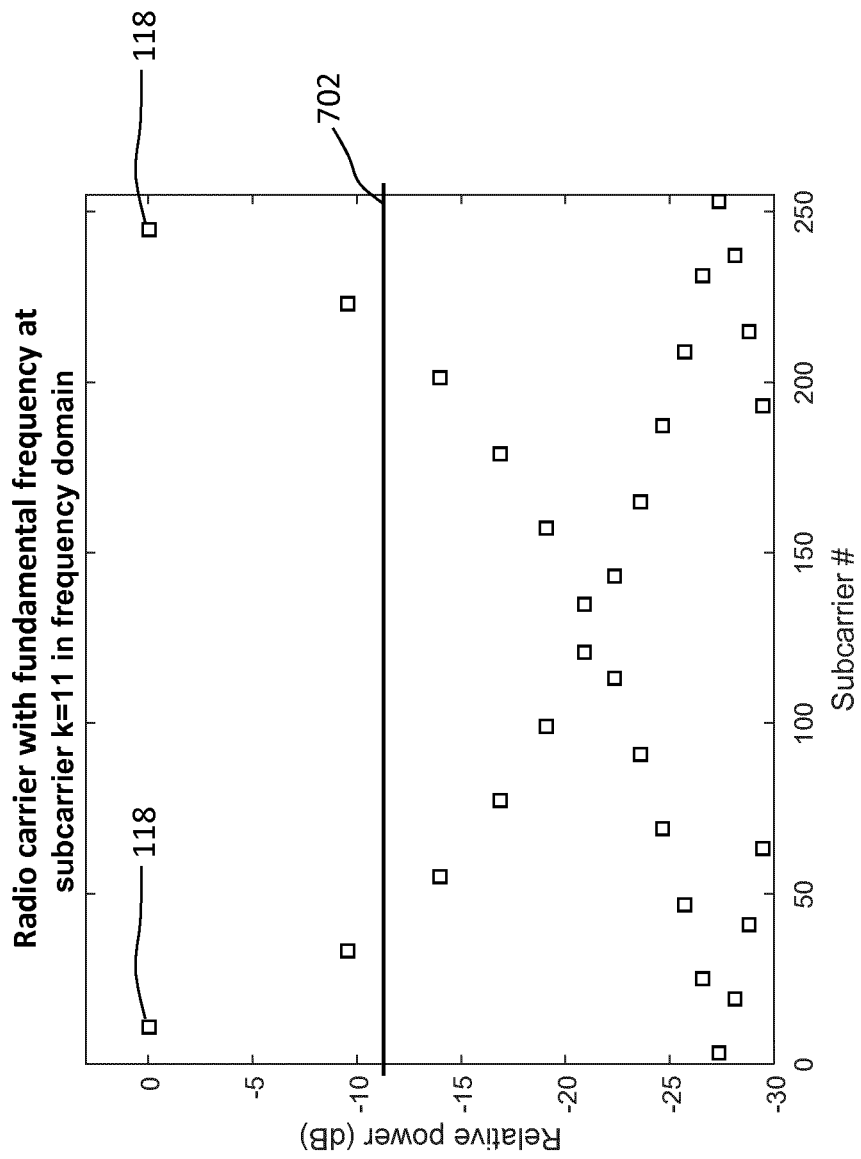
Figure 7C:
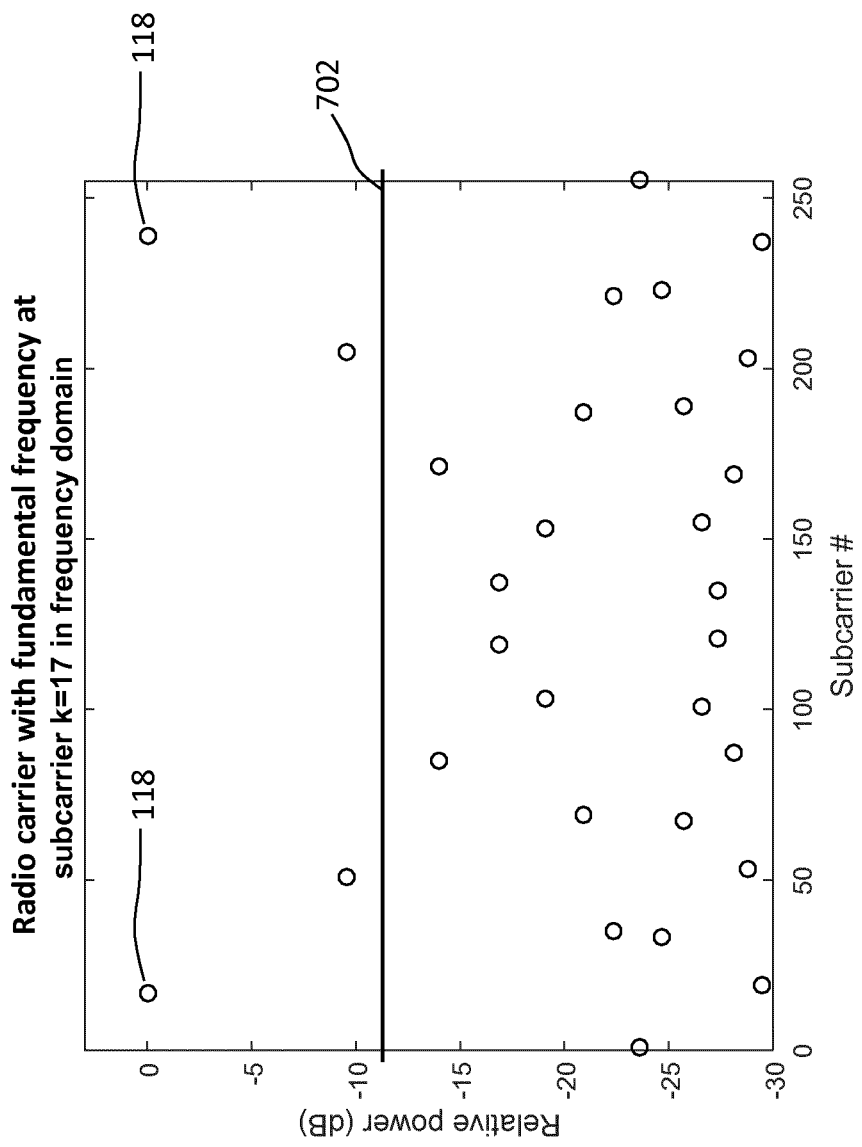
Figure 7D:
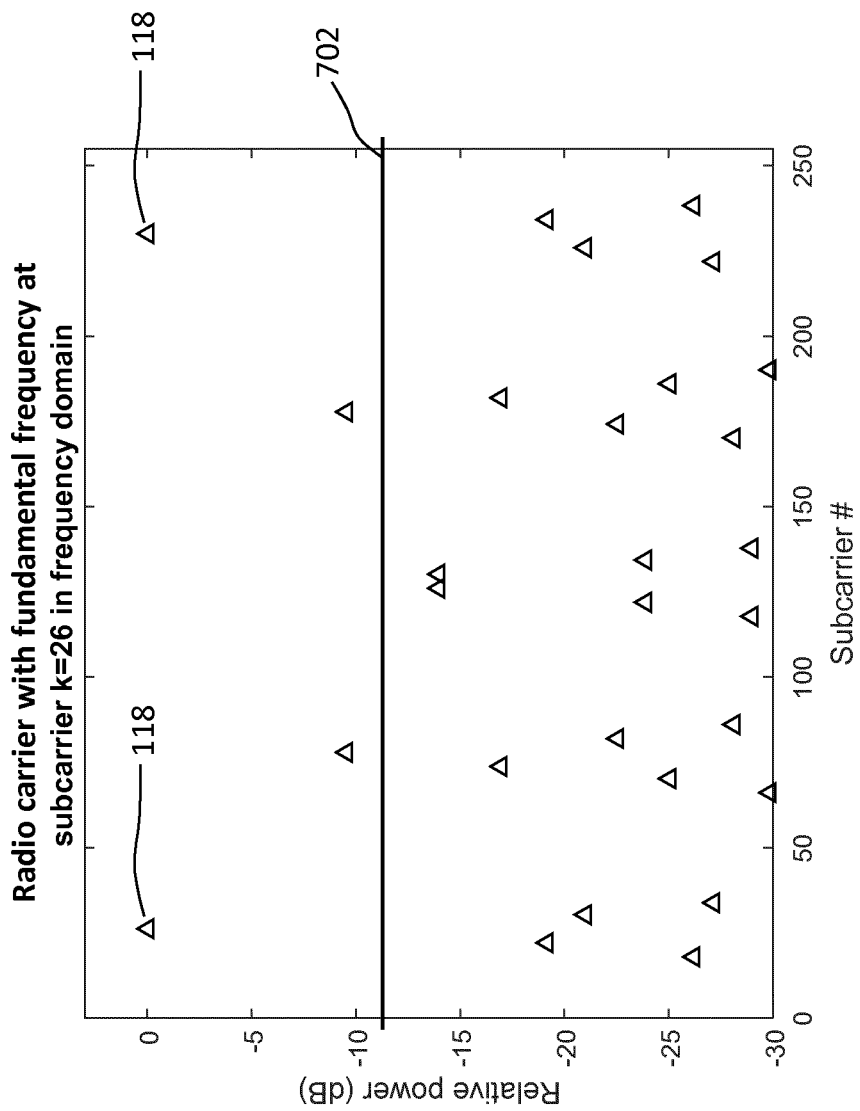

FIG. 6 shows an example for a carrier 118 using a non-sinusoidal waveform, i.e., a non-sinusoidal carrier 118, in the time domain 600 with time increasing from left to right. More specifically, FIG. 6 schematically illustrates a carrier 118 using a square wave as the waveform. The exemplary fundamental frequency (i.e., the carrier frequency) of the square wave is $f_k$=6·78 125 Hz=468.75 kHz. The exemplary duration of the modulation symbol 116 is 12.8 μs.

Furthermore, the plot in FIG. 6 schematically illustrates an implementation for M=2 different modulation symbols 116 in the time domain 600. For example, each bit 116 is mapped to one of the M=2 phases 0 and $$\frac{\pi}{2},$$

which are illustrated with solid and dotted lines, respectively. That is, the square wave, as an example of the non-sinusoidal waveform, is shown in the time domain 600 for an exemplary fundamental frequency $f_k$ and in two different states of a BPSK, namely a first state keyed by phase being equal to 0 and a second state of the BPSK keyed by the phase being equal to $$\frac{\pi}{2}.$$

For M=4 different modulation symbols, each pair of subsequent bits 116 is mapped to one of the 4 phases 0, $$\frac{\pi}{2},$$

π and 3π/2.

Each of the square wave carriers may be generated by flipping a switch (e.g., a transistor) at the respectively assigned fundamental frequency 118. Since the non-sinusoidal carriers (e.g., square wave carriers) can be generated with less hardware resources and/or less energy consumption (e.g., as compared to sinusoidal carriers), the non-sinusoidal carriers are useful for transmitters in low-end devices, such as backscattering radio frequency tags (e.g., RFID tags) and/or IoT devices.

A switch can be used to change the load that is connected to an antenna, e.g., among a plurality of different loads. If the load is not matched to the antenna impedance and the antenna is illuminated by an incident radio signal, a back-scattering signal may be transmitted, which may implement the step 306. The back-scattered signal may have centers of frequency that differ from the center of frequency of the incident radio signal (e.g., the center of frequency of a RF carrier used for illuminating the antenna). In this case, the reflections appear in pairs, wherein a first reflection has a center of frequency higher than the center of frequency of the incident radio signal, and a second reflection has a center of frequency lower than the center of frequency of the incident radio signal. These upper and lower side bands of the back-scattered radio signal can be modulated and used for communications according to the step 306. Energy may be saved because there is no need to generate an RF carrier in the wireless device 100. Instead, the RF carrier for the incident radio signal may be generated by another device.

Multicarrier signals 120 based on square wave carriers 118 can be generated by flipping several switches implementing the modulator module 110. The switches (i.e., the non-sinusoidal modulators) may all reside in one embodiment of the device 100, or may be distributed among several embodiments of the device 100.

While the technique has been described with regard to embodiments and variants of the device 100 for transmitting the data, the skilled person can readily implement corresponding embodiments and variants of the device 200 for receiving such data on the non-sinusoidal carriers 118. Alternatively or in addition, the multicarrier signals 120 comprising the non-sinusoidal carriers 118 may be received using an OFDM receiver as an embodiment of the device 200. The fundamental frequencies, $f_k$, of the non-sinusoidal carriers 118 coincide with the centers of frequency of subcarriers used in the OFDM receiver.

For clarity and not limitation, embodiments using a square wave as the non-sinusoidal waveform are described. More specifically, the transmitting embodiment of the device 100 generates (or multiple transmitting embodiments of the device 100 in a multicarrier system generate) multicarrier signals based on square wave carriers.

A frequency raster of the non-sinusoidal carriers may coincide with the subcarrier raster in an OFDM system, in order to allow for OFDM receivers. That is, each of the fundamental frequencies corresponds to one of the OFDM subcarriers. Furthermore, since the baseband frequencies (or the corresponding up-converted radio frequencies) corresponding to the harmonic components are integer multiples of the respective one of the fundamental frequencies, each of the harmonic components also corresponds to one of the OFDM subcarriers. However, this is a non-limiting example, any regular subcarrier allocation can be employed.

The following notation is used to describe the multicarrier system. The sampling frequency is $F_s$, e.g. 20 MHz. The sampling period is $T=1/F_s$, e.g. 50 ns. The total number of subcarriers in the OFDM system is N, which may be even, particularly a power of two, e.g. 256. The subcarrier spacing (SCS)

$$\Delta f = \frac{F_s}{N},$$

e.g. 78125 Hz. The symbol duration is $$T_{SYM} = \frac{1}{\Delta f},$$

e.g. 12.8 μs. An optional cyclic prefix duration is $T_{CP}$, e.g. 3.2 us. The index (e.g., an integer, 0≤k<N) denoting the subcarrier number is k. That is, the baseband frequency of the subcarrier number k is $k\Delta f$.

The k-th subcarrier is a square wave with frequency $k\Delta f$ and is denoted by $s_k(t)$. Using phase shift keying (PSK), a group of data bits is mapped to a phase $\varphi_k$ and the square wave keyed by the data bits is representable by the following expression:

$$s_k(t,\varphi_k) = \text{sign}(\sin(2\pi k \Delta f t + \varphi_k)), \quad -T_{CP} \leq t \leq T_{SYM}.$$

The multicarrier signal x(t), i.e., the baseband signal 120, is generated by summing (e.g., at reference sign 112 in FIG. 5) over all active subcarriers, i.e., the subcarriers assigned with a fundamental frequency 118. Suppose that there are L active subcarriers labeled $k_1, \ldots, k_L$. The baseband signal 120 may be represented by $$x(t) = \sum_{i=1}^{L} s_{k_i}(t,\varphi_{k_i}).$$

The spectrum of the baseband signal 120, x(t), may be analyzed by considering the spectra of the carrier components $s_{k_i}(t,\varphi_{k_i})$. Hence, in what follows, the index k represents any of the subcarrier numbers $k_1, \ldots, k_L$.

An expression for each carrier component 118, $s_k$, is obtained by decomposing the carrier component 118, $s_k(t,\varphi_k)$, into a Fourier series, e.g., by means of a Fast Fourier Transformation (FFT) or using an analytic expression such as:

$$s_k(t,\varphi_k) = \frac{2}{j\pi} \sum_{n=0}^{\infty} \frac{1}{2n+1} ((\exp(j2\pi k(2n+1)\Delta f t + j(2n+1)\varphi_k) - \exp(-j2\pi k(2n+1)\Delta f t - j(2n+1)\varphi_k))). \quad (1)$$

Without loss of generality, consider a modulation symbol 116 corresponding to $\varphi_k=0$, so that the above expression is simplified to $$s_k(t,0) = \frac{2}{j\pi} \sum_{n=0}^{\infty} \frac{1}{2n+1} (\exp(j2\pi k(2n+1)\Delta f t) - \exp(-j2\pi k(2n+1)\Delta f t)).$$

Next, split the infinite sum into 2 terms:

$$s_k(t,0) = 2\frac{\exp(j2\pi k \Delta f t) - \exp(-j2\pi k \Delta f t)}{j\pi} + \frac{2}{j\pi} \sum_{n=1}^{\infty} \frac{1}{2n+1} (\exp(j2\pi k(2n+1)\Delta f t) - \exp(-j2\pi k(2n+1)\Delta f t)).$$

Since $$\frac{1}{\sum_{n=0}^{\infty} \left(\frac{1}{2n+1}\right)^2} = 0.81,$$

the first term in the series expansion of $s_k(t, 0)$ contains roughly 80% of the total signal energy.

Furthermore, the series expansion for $s_k$ shows that the energy in the k-th carrier component 118 of the baseband signal 120, x(t), is equally divided into the subcarriers labeled k and −k. Hence, if the multicarrier signal x(t) is received at an OFDM receiver, e.g., as an implementation of the device 200, then the phase $\varphi_k$ can be estimated from the subcarriers labeled k and N−k at the output of the FFT. If the one or more transmitters, e.g., as an implementation of the device 100, employ frequency shift keying (FSK), then an OFDM receiver can be used to determine the active subcarriers (e.g. by detecting the presence and/or absence of energy in the FFT frequency bins).

The second term in the series expansion of the k-th carrier component 118, $s_k(t, 0)$, that is the third and higher odd harmonic components of the k-th carrier 118, $$\frac{2}{j\pi} \sum_{n=1}^{\infty} \frac{1}{2n+1} (\exp(j2\pi k(2n+1)\Delta f t) - \exp(-j2\pi k(2n+1)\Delta f t)),$$

shows that the square waves would generate ICI at baseband frequencies that are odd multiples of the fundamental frequency $k\Delta f$, if conventionally arranged on the subcarrier raster. The arrangement according to the technique can avoid that energy is leaked into the frequency bins numbered 3 k, 5 k, ..., N−3 k, N−5 k, .... This is most easily seen by considering a digital signal obtained by sampling at instants t=mT.

$$s_k(m) \triangleq s_k(mT, 0) = 2\frac{\exp\left(\frac{j2\pi km}{N}\right) - \exp\left(-\frac{j2\pi km}{N}\right)}{j\pi} +$$

$$\frac{2}{j\pi}\sum_{n=1}^{\infty}\frac{1}{2n+1}\left(\exp\left(\frac{j2\pi k(2n+1)m}{N}\right) - \exp\left(-\frac{j2\pi k(2n+1)m}{N}\right)\right).$$

Below two tables summarize the distribution of energy of the non-sinusoidal carrier assigned with the fundamental frequency of the k-th OFDM subcarrier, when an FFT is used for the analysis, e.g., for the reception in the step 406.

The fundamental frequency, i.e., the first harmonic component is present in the following OFDM subcarriers.

| Term | Energy in OFDM subcarrier # |
|---|---|
| $\exp\left(\frac{j2\pi km}{N}\right)$ | k |
| $\exp\left(-\frac{j2\pi km}{N}\right)$ | N − k |

The third and higher odd harmonic components are present in the following OFDM subcarriers.

| Term | Energy aliased to OFDM subcarrier # |
|---|---|
| $\exp\left(\frac{j2\pi k(2n+1)m}{N}\right)$ | k(2n + 1) (mod N) |
| $\exp\left(-\frac{j2\pi k(2n+1)m}{N}\right)$ | −k(2n + 1) (mod N) |

Optionally, the terms with k(2n+1)>N/2 and/or −k(2n+1)<−N/2 may be effectively suppressed by the channel selective filter at the receiver.

The demodulation in the step 406 may be based on one or both of the OFDM subcarriers corresponding to the fundamental frequency and, optionally, based on the one or more higher harmonic components (e.g., the third harmonic component). If the i-th harmonic component, i>1 (e.g., i=k (2n+1) for odd harmonic components), is used for the demodulation of a modulation symbol according to M-ary PSK, preferably M and i are co-prime or incommensurable.

Below table further illustrates the energy leakage described in the above table by means of a concrete numerical example. The energy leakage is illustrated for subcarrier number k=5, i.e., for the carrier assigned with the fundamental frequency corresponding to the k-th OFDM subcarrier, using an FFT of size N=256.

| Non-zero higher harmonic components n | Subcarrier to which energy is leaked k (2n + 1) mod N | Subcarrier to which energy is leaked [−k (2n + 1)] mod N |
|---|---|---|
| 1 | 15 | 241 |
| 2 | 25 | 231 |
| 3 | 35 | 221 |

Below table shows the relative powers of the first few non-zero harmonic components. It can be seen that the energy of the third harmonic component (which is the above definition of n for the non-zero harmonic components with 0 representing the first harmonic component, i.e., the fundamental frequency) is non-negligible and could potentially limit the maximum SINR of some subcarriers to less than 10 dB in a conventional arrangement on the OFDM subcarrier.

| Non-zero harmonic component n | Harmonic component i = 2n + 1 | Relative energy distribution across the harmonic components $\frac{1}{(2n+1)^2}$ [dB] |
|---|---|---|
| 0 | 1 | 0 |
| 1 | 3 | −9.5 |
| 2 | 5 | −14.0 |
| 3 | 7 | −16.9 |

An example of generating, for the transmitting step 306, a multicarrier signal 120 comprising L active subcarriers, i.e., L carriers 118, is described. At the receiving device 200, the signal energy in the subcarrier number k is leaked into subcarriers number 3 k, 5 k, ..., N−3 k, N−5 k, ... when applying an FFT to the digital received multicarrier signal. Moreover, most of leakage occurs in the first few odd harmonics.

The methods 300 and/or 400 can be implemented to reduce or avoid ICI in the multicarrier signal 120 based on the assignment 304 and/or 404 of the fundamental frequencies 118. A threshold value γ for an acceptable ICI caused by a higher harmonic component is determined or predefined for the determining step 302 and/or 402. The maximum number of harmonic components $2n_{max}+1$ exceeding the threshold value γ is determined according to the step 302 and/or 402.

The L subcarrier labeled $k_1, \ldots k_L$, are chosen according to the step 304 and/or 404 such that each subcarrier number $k_m$ is different from the first $n_{max}$ harmonics of the L−1 other subcarriers assigned to a carrier. That is, the disjointness condition may be implemented in that $k_m$ is different from (2n+1)$k_p$ and different from N−(2n+1)$k_p$, for $1 \leq n \leq n_{max}$ and any p≠m, 1≤p≤L.

For example, $n_{max}=1$, that is, the set of harmonic components comprises the first harmonic component and the third harmonic component for avoiding ICI caused by the third harmonic from each carrier. This may be the most relevant case in practice, e.g., as the third harmonic component would dominate the ICI in a conventional arrangement on the subcarrier raster. In this example, the disjointness condition is fulfilled if none of the numbers $k_m$, 1≤m≤L is divisible by 3. In other words, as long as the subcarrier numbers are different from 3, 6, 9, ..., there will not be ICI due to the third harmonics.

The following example illustrates implementations of the assigning steps 304 and 404 of the methods 300 and 400. The multicarrier modulator 110 may comprise 4 switches each being configured to generate a square wave. That is, L=4 carriers may be generated by the multicarrier modulator 110, e.g., in the embodiment of FIG. 5. The switches implementing the non-sinusoidal modulators may all be located in one embodiment of the device 100, or they may be distributed over several radio devices each embodying the device 100. In the latter case, the radio devices in combination may fulfill the disjointness condition.

An embodiment of the device 200 may comprise an OFDM receiver using N=256 subcarriers. By way of example, ICI caused by any harmonic component being −13 dB or stronger relative to the fundamental tones (i.e., the first harmonics at the fundamental frequencies) is to be avoided. That is, the threshold value is γ=−13 dB. For example, in a Wi-Fi system (i.e., a wireless systems compatible with IEEE 802.11), modulation and coding schemes (MCS) using QPSK (i.e., PSK with M=4) require a modulation accuracy resulting in Error Vector Magnitude (EVM) under −13 dB, so this threshold value enables the use of QPSK without significant performance degradations. From the above table, it is determine in the step 302 and/or 402 that $n_{max}$=1, since the third harmonic (i.e., $3=2n_{max}+1=2\cdot1+1$) is the only higher harmonic component exceeding the threshold value. Then, assigning to the square wave carriers any subcarrier labels, k, not divisible by 3 fulfills the disjointness condition, and results in ICI under the indicated threshold value.

Many assignments fulfill the disjointness condition, one of which is for example $k_1$=5, $k_2$=11, $k_3$=17, $k_4$=26. The magnitude of the output of the FFT, that is the energy level occupancy, for each of the L=4 square wave carriers is shown individually in FIGS. 7A to 7D, respectively. The threshold value is shown at reference sign 702. At the receiving device 200, the subcarriers are defined by the output of the FFT, which may also be referred to as frequency bins.

More specifically, FIGS. 7A to 7D depict two component carriers 118. These correspond to a situation, wherein an antenna is illuminated by an incident RF signal, the antenna is connected to one among a plurality of loads through a switch, which is flipped at a frequency equal to the fundamental frequency of a component carrier 118. If the loads are not matched to the antenna impedance, back-scattering occurs. The two component carriers correspond to upper and lower side bands of the back-scattered radio signal.

In any embodiment or implementation, the subcarriers with labels $k_m$ and N−$k_m$ may be keyed by the same data bits, i.e., according to the same modulation symbol 116. This occurs, for example, when the two component carriers 118 arise from upper and lower side bands of the back-scattered radio signal. Therefore, in an OFDM receiver embodying the device 200, the output in the frequency bins $k_m$ and N−$k_m$ may be coherently combined, taking into account that the complex constellation symbol in the frequency bin N−$k_m$ is the complex conjugate of the complex constellation symbol in the frequency bin $k_m$, as can be seen by above exemplary Fourier series expansion.

Figure 8:
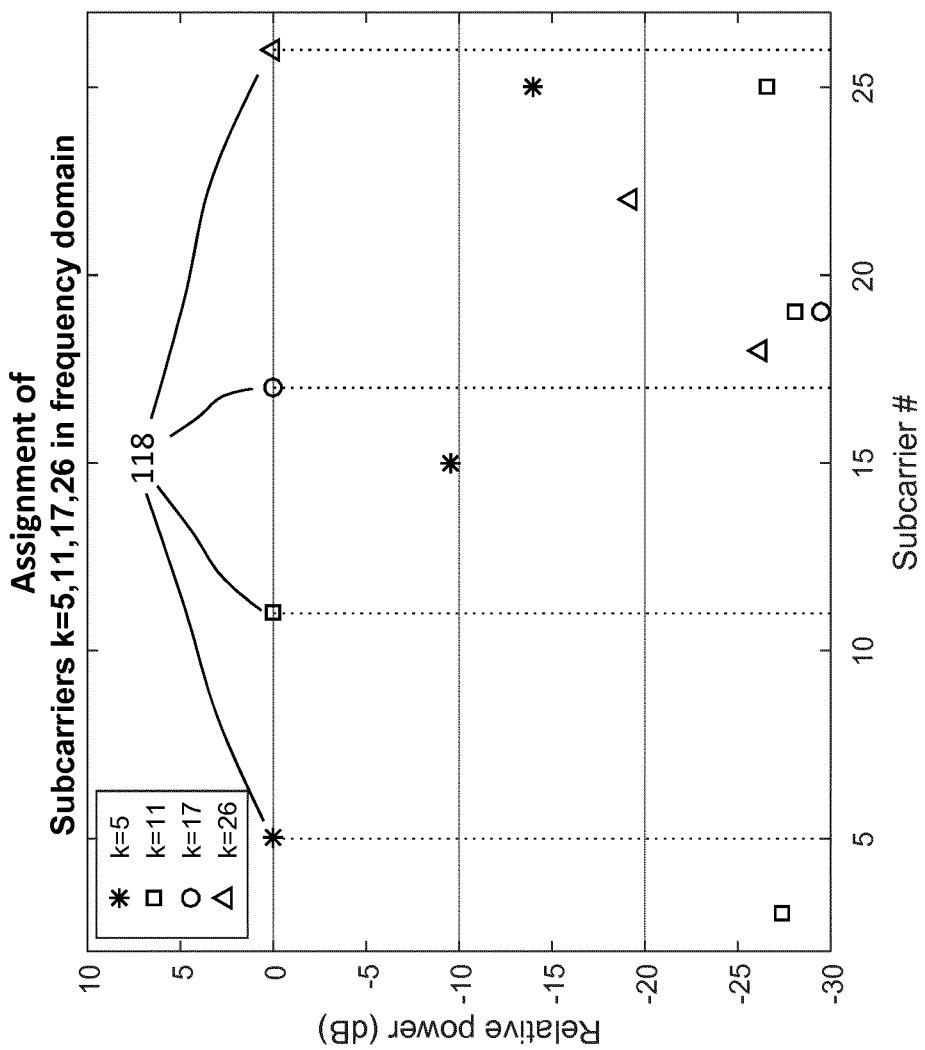
FIG. 8 schematically illustrates an occupancy of subcarriers resulting from an exemplary assignment of fundamental frequencies.

FIG. 8 schematically illustrates an exemplary output of a FFT in the step 406 for a multicarrier signal 120 comprising a superposition of the L=4 square wave carriers, i.e., L=4 square waves at the respectively assigned fundamental frequencies 118. The multicarrier signal 120 is input to the demodulation in the step 406. In the frequency domain 800 of FIG. 8, not all frequency bins are illustrated. For clarity, only a window comprising desired signal energy is illustrated. It can be seen that the ICI is negligible, e.g., below −30 dB.

Furthermore, it can be seen in FIG. 8 that the third harmonic of the subcarrier k=5, falling in the frequency bin k=3·5=15, has non-negligible energy, and could be used to improve the demodulation performance and give additional frequency diversity. The subcarrier allocation method can be generalized to ensure that neither the subcarriers $k_m$ nor their third harmonics 3 $k_m$ are corrupted by ICI over a certain threshold value.

At the receiver side, an OFDM receiver may be employed in the device 200, wherein the output of the frequency bins $k_m$, N−$k_m$, 3 $k_m$, N−3 $k_m$ may be coherently combined. The above Fourier series expansion in Eq. (1) shows that the third harmonic in the subcarrier labeled 3 $k_m$ possesses modulation information, namely a phase equal to $3\varphi_{k_m}$. Assuming that QPSK is used, the relation between the phases in the fundamental frequency (i.e., the first harmonic component) and third harmonic component are shown in below table. It is evident from the below table that the subcarrier labeled 3 $k_m$ carries a complex conjugate of the QPSK symbol carried by subcarrier label $k_m$. This has to be taken into account when coherently combining the output of the frequency bins $k_m$, N−$k_m$, 3 $k_m$, N−3 $k_m$.

| Phase in φ fundamental tone | Phase 3φ mod 2π in third harmonic |
| --- | --- |
| 0 | 0 |
| π/2 | 3π/2 |
| π | π |
| 3π/2 | π/2 |

The phase of the third harmonic component (in the right column of above table) is related to the phase of the fundamental frequency (in the left column).

While the above embodiments for the device 200, particularly for implementing a demodulation in the step 406, have been described using an FFT, the same method for subcarrier allocation (i.e., for assigning fundamental frequencies to non-sinusoidal carriers) can be employed even if the one or more receivers do not employ an FFT. Furthermore, while the technique has been described for baseband frequencies, the subcarriers labeled by $k_m$ may be identified with frequencies (e.g., radio frequencies) $F_c+k_m\Delta f$, and/or subcarriers labeled by N−$k_m$ may identified with frequencies (e.g., radio frequencies) $F_c−k_m\Delta f$, wherein $F_c$ is an arbitrary reference frequency (e.g., a nominal center of frequency of a radio channel).

Figure 9:
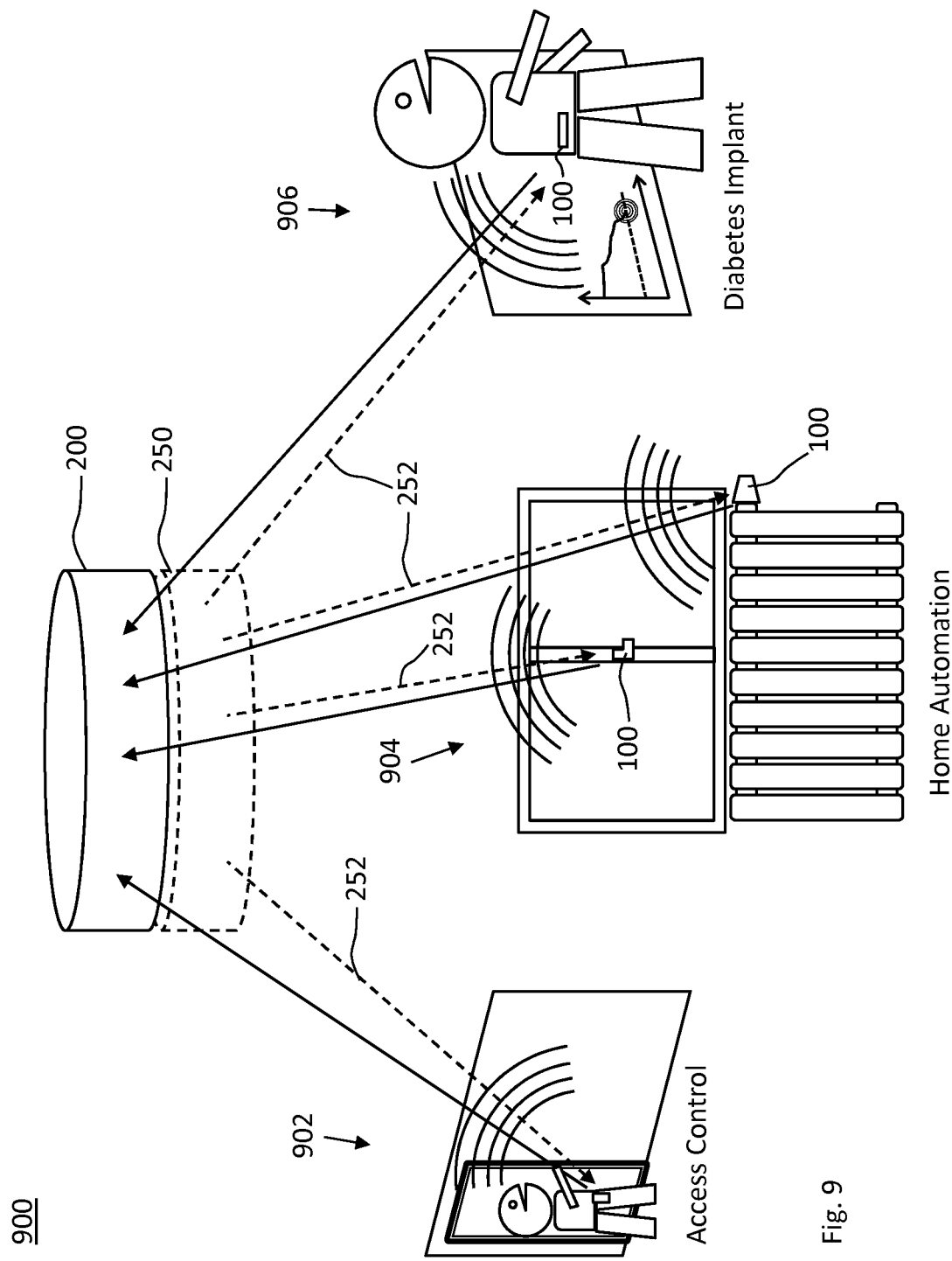
FIG. 9 schematically illustrates implementations of the devices of FIGS. 1 and 2.

FIG. 9 schematically illustrates uses cases of the technique. Any of the aspects of the technique may be implemented in the exemplary radio environment 900 shown in FIG. 9. At least some embodiments of the devices 100 and 200 use the non-sinusoidal carriers for establishing an encrypted communication and/or a challenge-response communication. An embodiment of the device 200 may be deployed in a building, e.g., for a micro cell and/or in a stand-alone deployment.

The energy efficiency and/or compactness of circuitry for generating the non-sinusoidal carriers, particular square waves, enables many different embodiments. Embodiments of the device 100 may include a mobile radio device 902, e.g., a mobile broadband device comprising an application for access control or a wireless key (such as an access control key fob). Alternatively or in addition, embodiments 904 of the device 100 may include connected devices, e.g., sensors or actuators for home automation or a security alarm system. Alternatively or in addition, embodiments 906 of the device 100 may be configured for health assistance, e.g., implants or contact lenses for monitoring a health status such as glucose levels.

Furthermore, any of the embodiments of the device 100 can be implemented as a passive radio device. The device 200, or a dedicated device 250, may transmit an incident radio signal that is incident to passive device 100 and backscattered from the passive device 100 by modulating the impedance of an antenna of the passive device 100.

Figure 10:
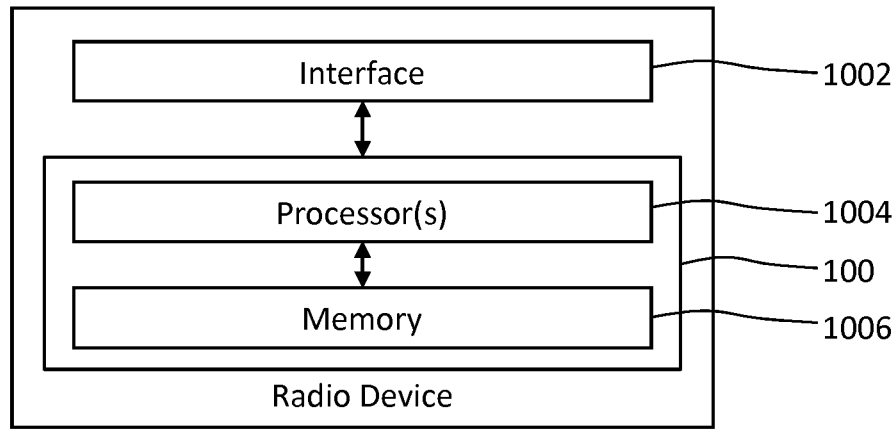
FIG. 10 shows a schematic block diagram of a second embodiment of the device of FIG. 1.

FIG. 10 shows a schematic block diagram for an embodiment of the device 100. The device 100 comprises one or more processors 1004 for performing the method 300 and memory 1006 coupled to the processors 1004. For example, the memory 1006 may be encoded with instructions that implement at least one of the modules 102, 104 and 106.

The one or more processors 1004 may be a combination of one or more of a microprocessor, controller, microcontroller, central processing unit, digital signal processor, application specific integrated circuit, field programmable gate array, or any other suitable computing device, resource, or combination of hardware, microcode and/or encoded logic operable to provide, either alone or in conjunction with other components of the device 100, such as the memory 1006, data transmitter and/or UE functionality. For example, the one or more processors 1004 may execute instructions stored in the memory 1006. Such functionality may include providing various features and steps discussed herein, including any of the benefits disclosed herein. The expression "the device being operative to perform an action" may denote the device 100 being configured to perform the action.

As schematically illustrated in FIG. 10, the device 100 may be embodied by a radio device 1000, e.g., configured to access a RAN or for ad-hoc communication with another radio device. The radio device 1000 comprises a radio interface 1002 coupled to the device 100 for radio communication with a base station (e.g., of the RAN) or the other radio device.

In a variant, the functionality of the device 100 is provided by a node connected to the radio device 1000. That is, the node performs the method 300 by initiating the corresponding steps. The functionality of the device 100 is provided by the node to the radio device 1000, e.g., via the interface 1002 or a dedicated wired or wireless interface.

Figure 11:
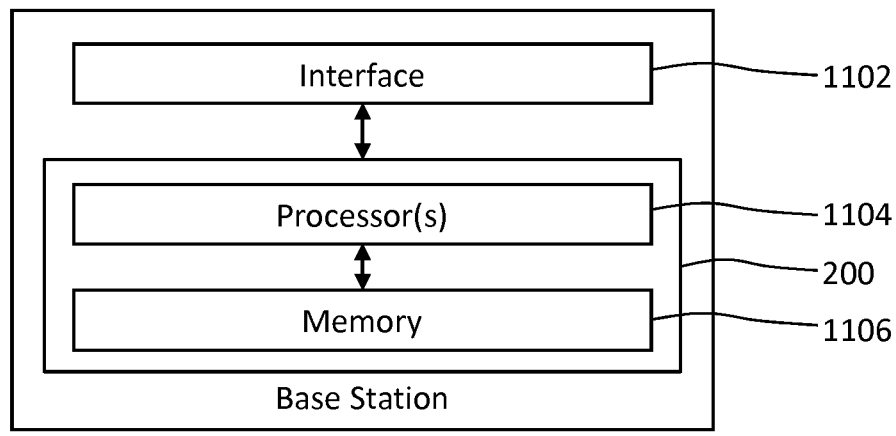
FIG. 11 shows a schematic block diagram of a first embodiment of the device of FIG. 2.

FIG. 11 shows a schematic block diagram for an embodiment of the device 200. The device 200 comprises one or more processors 1104 for performing the method 400 and memory 1106 coupled to the processors 1104. For example, the memory 1106 may be encoded with instructions that implement at least one of the modules 202, 204 and 206.

The one or more processors 1104 may be a combination of one or more of a microprocessor, controller, microcontroller, central processing unit, digital signal processor, application specific integrated circuit, field programmable gate array, or any other suitable computing device, resource, or combination of hardware, microcode and/or encoded logic operable to provide, either alone or in conjunction with other components of the device 200, such as the memory 1106, data receiver and/or base station. For example, the one or more processors 1104 may execute instructions stored in the memory 1106. Such functionality may include providing various features and steps discussed herein, including any of the benefits disclosed herein. The expression "the device being operative to perform an action" may denote the device 200 being configured to perform the action.

As schematically illustrated in FIG. 11, the device 200 may be embodied by a base station 1100, e.g., configured to provide radio access within a RAN. The radio device 1100 comprises a radio interface 1102 coupled to the device 200 for radio communication with one or more radio devices.

In a variant, the functionality of the device 200 is provided by one or more nodes coupled to the base station 1100 (e.g., any node of the RAN or a core network linked to the RAN). That is, the node performs the method 400 by initiating the corresponding steps. The functionality of the device 200 is provided by the node to the base station 1100, e.g., via the interface 1102 or a dedicated wired or wireless interface.

Figure 12:
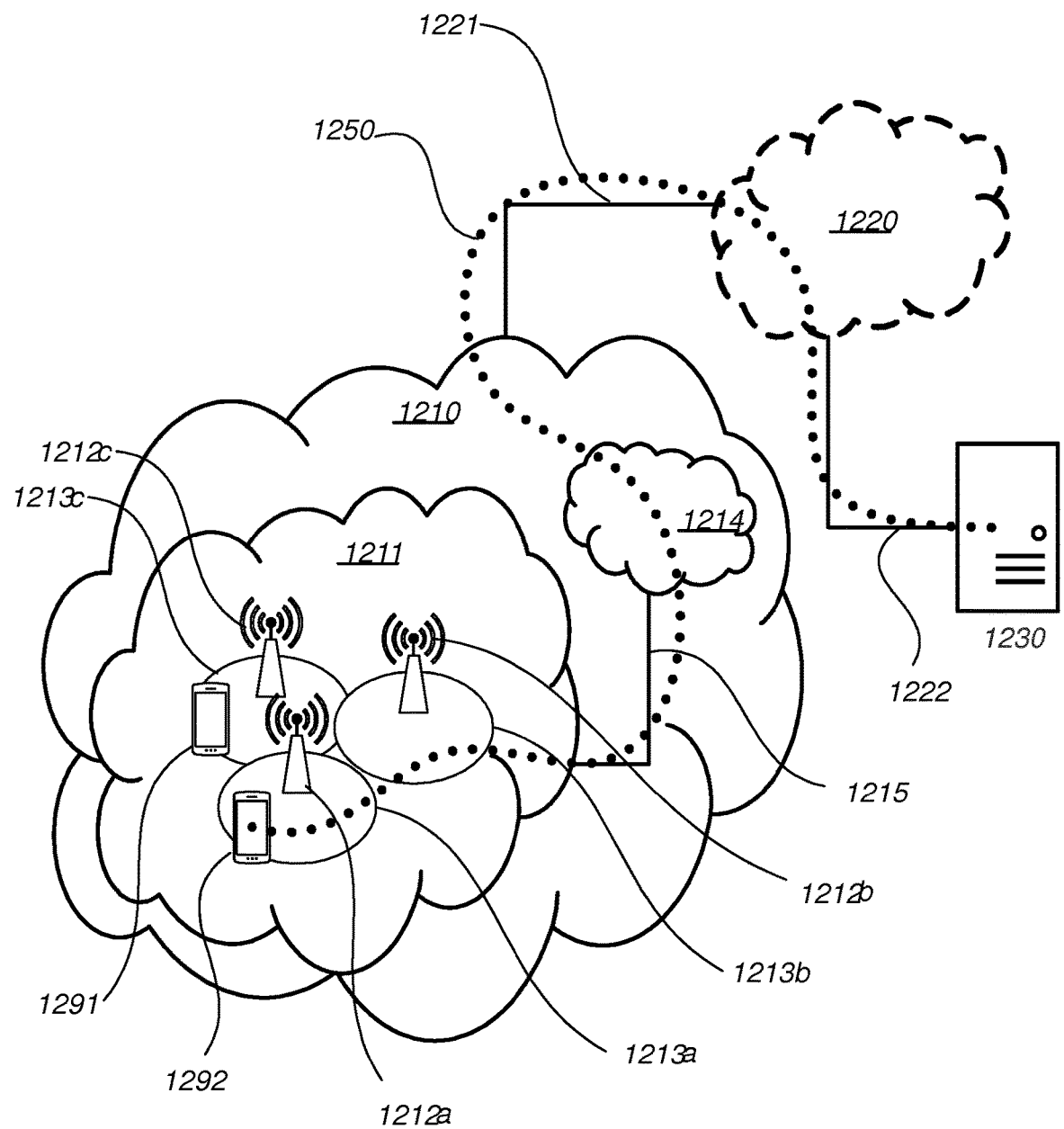
FIG. 12 schematically illustrates a telecommunication network connected via an intermediate network to a host computer.

With reference to FIG. 12, in accordance with an embodiment, a communication system 1200 includes a telecommunication network 1210, such as a 3GPP-type cellular network, which comprises an access network 1211, such as a radio access network, and a core network 1214. The access network 1211 comprises a plurality of base stations 1212a, 1212b, 1212c, such as NBs, eNBs, gNBs or other types of wireless access points, each defining a corresponding coverage area 1213a, 1213b, 1213c. Each base station 1212a, 1212b, 1212c is connectable to the core network 1214 over a wired or wireless connection 1215. A first user equipment (UE) 1291 located in coverage area 1213c is configured to wirelessly connect to, or be paged by, the corresponding base station 1212c. A second UE 1292 in coverage area 1213a is wirelessly connectable to the corresponding base station 1212a. While a plurality of UEs 1291, 1292 are illustrated in this example, the disclosed embodiments are equally applicable to a situation where a sole UE is in the coverage area or where a sole UE is connecting to the corresponding base station 1212.

Any one of the base stations 1212a, 1212b, 1212c may embody a device 200 and/or perform the method 400.

The telecommunication network 1210 is itself connected to a host computer 1230, which may be embodied in the hardware and/or software of a standalone server, a cloud-implemented server, a distributed server or as processing resources in a server farm. The host computer 1230 may be under the ownership or control of a service provider, or may be operated by the service provider or on behalf of the service provider. The connections 1221, 1222 between the telecommunication network 1210 and the host computer 1230 may extend directly from the core network 1214 to the host computer 1230 or may go via an optional intermediate network 1220. The intermediate network 1220 may be one of, or a combination of more than one of, a public, private or hosted network; the intermediate network 1220, if any, may be a backbone network or the Internet; in particular, the intermediate network 1220 may comprise two or more sub-networks (not shown).

The communication system 1200 of FIG. 12 as a whole enables connectivity between one of the connected UEs 1291, 1292 and the host computer 1230. The connectivity may be described as an over-the-top (OTT) connection 1250. The host computer 1230 and the connected UEs 1291, 1292 are configured to communicate data and/or signaling via the OTT connection 1250, using the access network 1211, the core network 1214, any intermediate network 1220 and possible further infrastructure (not shown) as intermediaries. The OTT connection 1250 may be transparent in the sense that the participating communication devices through which the OTT connection 1250 passes are unaware of routing of uplink and downlink communications. For example, a base station 1212 may not or need not be informed about the past routing of an incoming downlink communication with data originating from a host computer 1230 to be forwarded (e.g., handed over) to a connected UE 1291. Similarly, the base station 1212 need not be aware of the future routing of an outgoing uplink communication originating from the UE 1291 towards the host computer 1230.

Example implementations, in accordance with an embodiment, of the UE, base station and host computer discussed in the preceding paragraphs will now be described with reference to FIG. 13. In a communication system 1300, a host computer 1310 comprises hardware 1315 including a communication interface 1316 configured to set up and maintain a wired or wireless connection with an interface of a different communication device of the communication system 1300. The host computer 1310 further comprises processing circuitry 1318, which may have storage and/or processing capabilities. In particular, the processing circuitry 1318 may comprise one or more programmable processors, application-specific integrated circuits, field programmable gate arrays or combinations of these (not shown) adapted to execute instructions. The host computer 1310 further comprises software 1311, which is stored in or accessible by the host computer 1310 and executable by the processing circuitry 1318. The software 1311 includes a host application 1312. The host application 1312 may be operable to provide a service to a remote user, such as a UE 1330 connecting via an OTT connection 1350 terminating at the UE 1330 and the host computer 1310. In providing the service to the remote user, the host application 1312 may provide user data which is transmitted using the OTT connection 1350.

The communication system 1300 further includes a base station 1320 provided in a telecommunication system and comprising hardware 1325 enabling it to communicate with the host computer 1310 and with the UE 1330. The hardware 1325 may include a communication interface 1326 for setting up and maintaining a wired or wireless connection with an interface of a different communication device of the communication system 1300, as well as a radio interface 1327 for setting up and maintaining at least a wireless connection 1370 with a UE 1330 located in a coverage area (not shown in FIG. 13) served by the base station 1320. The communication interface 1326 may be configured to facilitate a connection 1360 to the host computer 1310. The connection 1360 may be direct or it may pass through a core network (not shown in FIG. 13) of the telecommunication system and/or through one or more intermediate networks outside the telecommunication system. In the embodiment shown, the hardware 1325 of the base station 1320 further includes processing circuitry 1328, which may comprise one or more programmable processors, application-specific integrated circuits, field programmable gate arrays or combinations of these (not shown) adapted to execute instructions. The base station 1320 further has software 1321 stored internally or accessible via an external connection.

The communication system 1300 further includes the UE 1330 already referred to. Its hardware 1335 may include a radio interface 1337 configured to set up and maintain a wireless connection 1370 with a base station serving a coverage area in which the UE 1330 is currently located. The hardware 1335 of the UE 1330 further includes processing circuitry 1338, which may comprise one or more programmable processors, application-specific integrated circuits, field programmable gate arrays or combinations of these (not shown) adapted to execute instructions. The UE 1330 further comprises software 1331, which is stored in or accessible by the UE 1330 and executable by the processing circuitry 1338. The software 1331 includes a client application 1332. The client application 1332 may be operable to provide a service to a human or non-human user via the UE 1330, with the support of the host computer 1310. In the host computer 1310, an executing host application 1312 may communicate with the executing client application 1332 via the OTT connection 1350 terminating at the UE 1330 and the host computer 1310. In providing the service to the user, the client application 1332 may receive request data from the host application 1312 and provide user data in response to the request data. The OTT connection 1350 may transfer both the request data and the user data. The client application 1332 may interact with the user to generate the user data that it provides.

Figure 13:
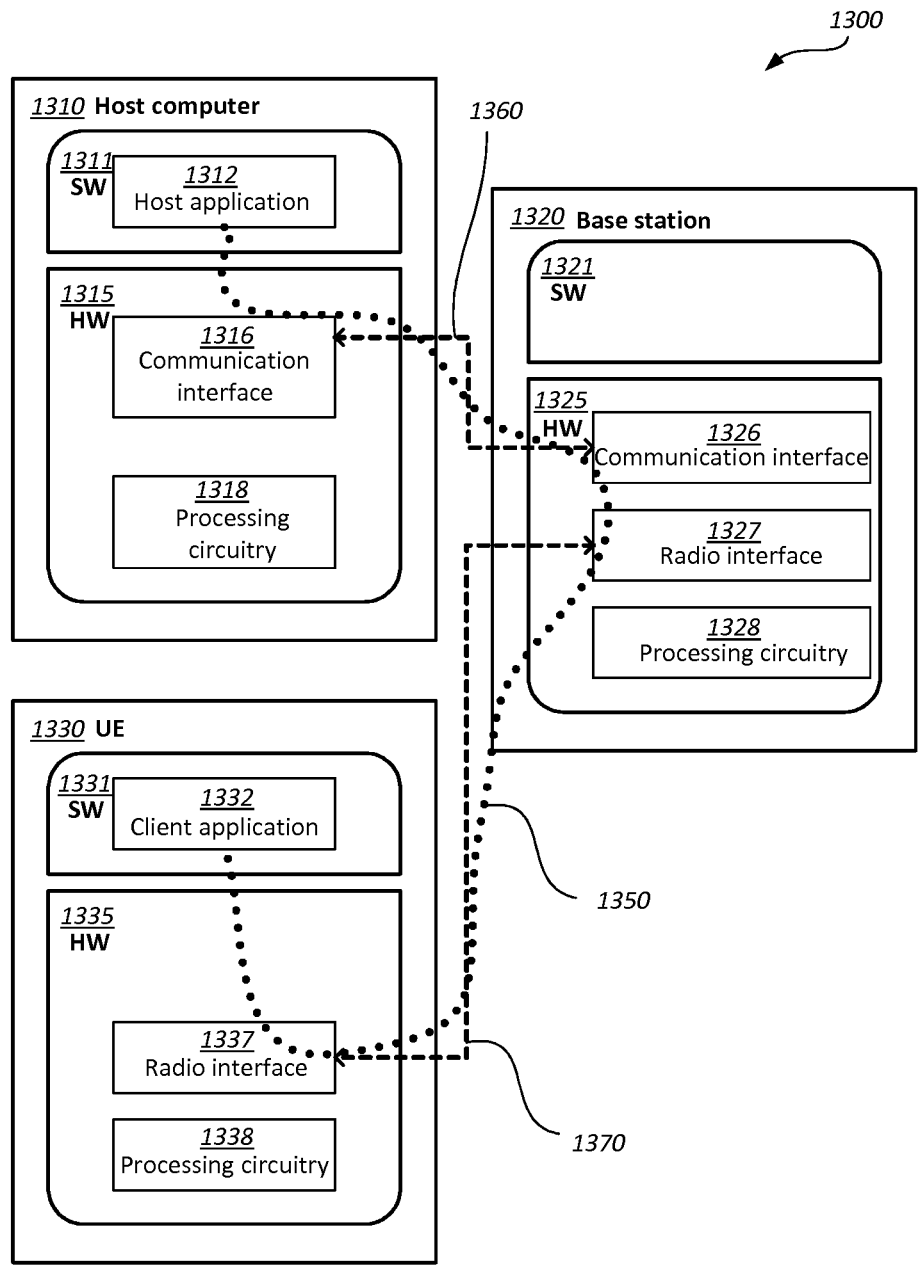
FIG. 13 shows a generalized block diagram of a host computer communicating via a base station with a user equipment over a partially wireless connection.

It is noted that the host computer 1310, base station 1320 and UE 1330 illustrated in FIG. 13 may be identical to the host computer 1230, one of the base stations 1212a, 1212b, 1212c and one of the UEs 1291, 1292 of FIG. 12, respectively. This is to say, the inner workings of these entities may be as shown in FIG. 13 and independently, the surrounding network topology may be that of FIG. 12.

In FIG. 13, the OTT connection 1350 has been drawn abstractly to illustrate the communication between the host computer 1310 and the use equipment 1330 via the base station 1320, without explicit reference to any intermediary devices and the precise routing of messages via these devices. Network infrastructure may determine the routing, which it may be configured to hide from the UE 1330 or from the service provider operating the host computer 1310, or both. While the OTT connection 1350 is active, the network infrastructure may further take decisions by which it dynamically changes the routing (e.g., on the basis of load balancing consideration or reconfiguration of the network).

The wireless connection 1370 between the UE 1330 and the base station 1320 is in accordance with the teachings of the embodiments described throughout this disclosure. One or more of the various embodiments improve the performance of OTT services provided to the UE 1330 using the OTT connection 1350, in which the wireless connection 1370 forms the last segment. More precisely, the teachings of these embodiments may reduce the latency and improve the data rate and thereby provide benefits such as better responsiveness.

A measurement procedure may be provided for the purpose of monitoring data rate, latency and other factors on which the one or more embodiments improve. There may further be an optional network functionality for reconfiguring the OTT connection 1350 between the host computer 1310 and UE 1330, in response to variations in the measurement results. The measurement procedure and/or the network functionality for reconfiguring the OTT connection 1350 may be implemented in the software 1311 of the host computer 1310 or in the software 1331 of the UE 1330, or both. In embodiments, sensors (e.g., those at reference sing 904 in FIG. 9) may be deployed in or in association with communication devices through which the OTT connection 1350 passes; the sensors may participate in the measurement procedure by supplying values of the monitored quantities exemplified above, or supplying values of other physical quantities from which software 1311, 1331 may compute or estimate the monitored quantities. The reconfiguring of the OTT connection 1350 may include message format, retransmission settings, preferred routing etc.; the reconfiguring need not affect the base station 1320, and it may be unknown or imperceptible to the base station 1320. Such procedures and functionalities may be known and practiced in the art. In certain embodiments, measurements may involve proprietary UE signaling facilitating the host computer's 1310 measurements of throughput, propagation times, latency and the like. The measurements may be implemented in that the software 1311, 1331 causes messages to be transmitted, in particular empty or "dummy" messages, using the OTT connection 1350 while it monitors propagation times, errors etc.

Figures 14, 15:
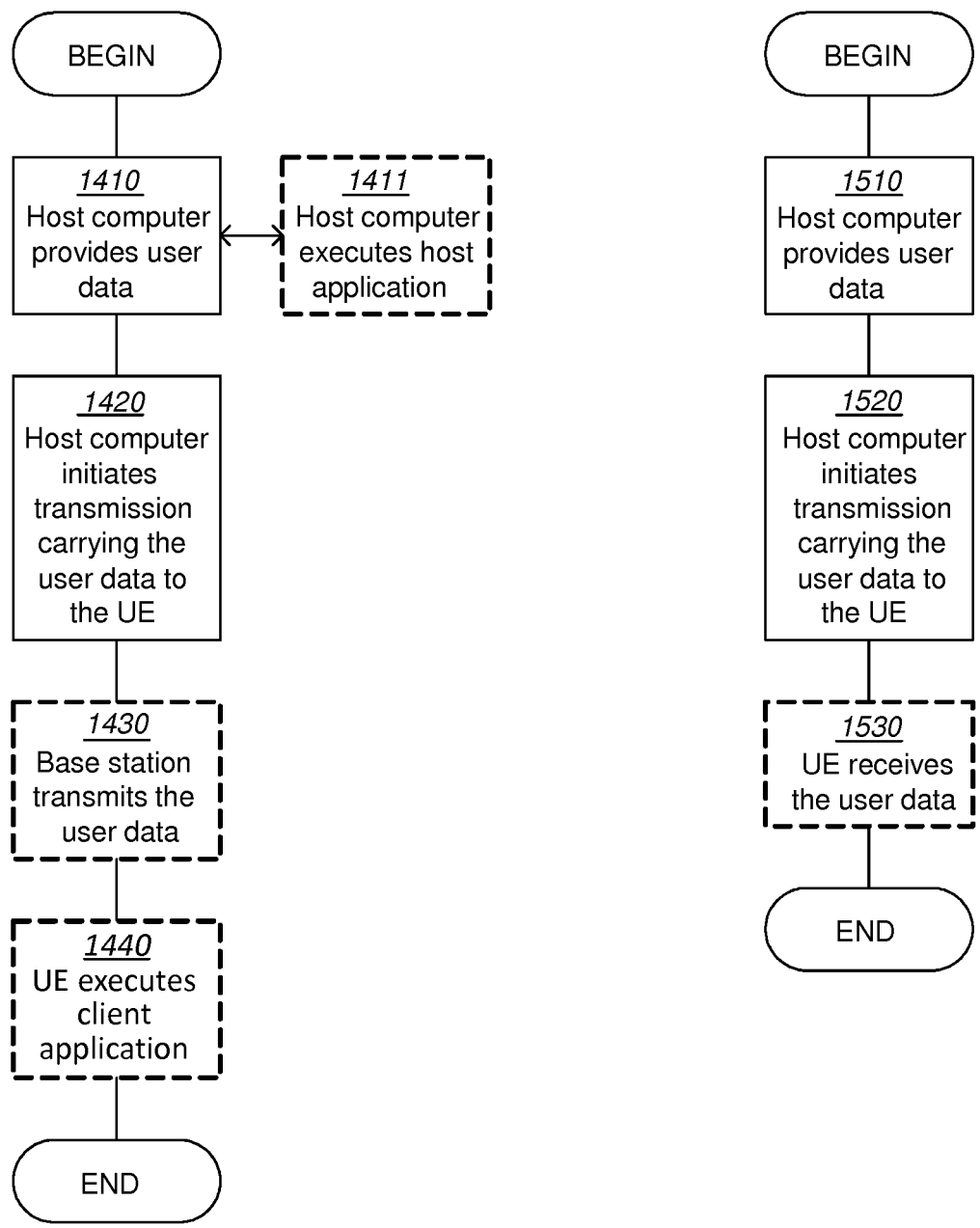
FIGS. 14 and 15 show flowcharts for methods implemented in a communication system including a host computer, a base station and a user equipment.

FIG. 14 is a flowchart illustrating a method implemented in a communication system, in accordance with one embodiment. The communication system includes a host computer, a base station and a UE which may be those described with reference to FIGS. 12 and 13. For simplicity of the present disclosure, only drawing references to FIG. 14 will be included in this section. In a first step 1410 of the method, the host computer provides user data. In an optional substep 1411 of the first step 1410, the host computer provides the user data by executing a host application. In a second step 1420, the host computer initiates a transmission carrying the user data to the UE. In an optional third step 1430, the base station transmits to the UE the user data which was carried in the transmission that the host computer initiated, in accordance with the teachings of the embodiments described throughout this disclosure. In an optional fourth step 1440, the UE executes a client application associated with the host application executed by the host computer.

FIG. 15 is a flowchart illustrating a method implemented in a communication system, in accordance with one embodiment. The communication system includes a host computer, a base station and a UE which may be those described with reference to FIGS. 12 and 13. For simplicity of the present disclosure, only drawing references to FIG. 15 will be included in this section. In a first step 1510 of the method, the host computer provides user data. In an optional substep (not shown) the host computer provides the user data by executing a host application. In a second step 1520, the host computer initiates a transmission carrying the user data to the UE. The transmission may pass via the base station, in accordance with the teachings of the embodiments described throughout this disclosure. In an optional third step 1530, the UE receives the user data carried in the transmission.

In any embodiment, the technique may be implemented as a method of allocating subcarriers to non-sinusoidal carriers in a multicarrier system. The non-sinusoidal carriers may be square wave carriers. A threshold value representing a level of ICI that is acceptable in order to maintain a performance target may be determined. Alternatively or in addition, based on the threshold value, it may be determined which odd harmonics of the fundamental frequencies generate ICI exceeding the threshold according to the step 302 and/or 402. In the step 304 and/or 404, the subcarriers for the fundamental frequencies are chosen such that these frequencies do not coincide with any of the harmonic components in the set determined in the step 302 and/or 402.

For example, the indices of subcarrier for the fundamental frequencies are (optionally with one exception) chosen to not be multiples of 3 (i.e., different from 3, 6, 9, 12, etc.) in order to avoid ICI due to the third harmonics. Alternatively or in addition, the subcarrier frequencies are chosen so that their third harmonics do not coincide with any of the harmonics determined in the step 302 and/or 402.

An OFDM receiver may be adapted to receive the multicarrier signals generated by a multicarrier system based on square wave sub-carriers. The output of an FFT of the OFDM receiver with frequency bins corresponding to mirror frequencies $k\Delta f$ and $-k\Delta f$ are coherently combined taking into account that the complex constellation symbols in these bins convey the same data bits and are complex conjugate of each other.

For example, the output of the FFT with frequency bins corresponding to mirror frequencies $k\Delta f$, $3 k\Delta f$, $-k\Delta f$, $-3 k\Delta f$ are coherently combined taking into account that the complex constellation symbols in these bins convey the same data bits and phase of the complex constellation symbol corresponding to $3 k\Delta f$ is 3 times the phase of the complex constellation symbol corresponding to $k\Delta f$. Similarly, the complex constellation symbol corresponding to $-3 k\Delta f$ is 3 times the phase of the complex constellation symbol corresponding to $-k\Delta f$.

As has become apparent from above description, embodiments of the technique enable the use of OFDM receivers for multicarrier signals generated using non-sinusoidal carriers, such as square wave carriers. Same or further embodiments can significantly decrease the amount of ICI, yielding good performance when equalization is performed in the frequency domain, via the FFT. More generally, the invention may help decrease ICI and/or adjacent channel interference in multicarrier systems using square wave subcarriers.

Many advantages of the present invention will be fully understood from the foregoing description, and it will be apparent that various changes may be made in the form, construction and arrangement of the units and devices without departing from the scope of the invention and/or without sacrificing all of its advantages. Since the invention can be varied in many ways, it will be recognized that the invention should be limited only by the scope of the following claims.

The invention claimed is:

1. A method of transmitting data on carriers each using a non-sinusoidal waveform, the method comprising:
    assigning a fundamental frequency to each of the carriers using the non-sinusoidal waveform, wherein baseband frequencies corresponding to a set of harmonic components of the non-sinusoidal waveform at each of the assigned fundamental frequencies are disjoint, wherein an energy of each of the harmonic components in the set is greater than a predefined threshold value; and
    transmitting modulation symbols representative of the data on at least one of the carriers.

2. The method of claim 1, wherein the transmitting comprises modulating the at least one carrier according to a phase and/or an amplitude of one or more modulation symbols to be transmitted on the respective carrier.

3. The method of claim 1, wherein the transmitting comprises:
    for each of the at least one carrier used for the transmission, driving a non-sinusoidal signal generator for generating the non-sinusoidal waveform at the fundamental frequency assigned to the respective carrier and according to one or more modulation symbols to be transmitted on the respective carrier.

4. The method of claim 1, wherein the transmitting comprises:
    for each of the at least one carrier used for the transmission, modulating an antenna circuit using the non-sinusoidal waveform at the fundamental frequency assigned to the respective carrier and according to one or more modulation symbols to be transmitted on the respective carrier.

5. The method of claim 1, further comprising determining the set of harmonic components of the non-sinusoidal waveform.

6. The method of claim 1, wherein the threshold value for the energy of each of the harmonic components in the set is relative to an energy of the non-sinusoidal waveform or relative to an energy of the fundamental frequency of the non-sinusoidal waveform.

7. The method of claim 1, wherein each of the assigned fundamental frequencies and/or each of the baseband frequencies corresponds to one of a plurality of subcarriers with subcarrier spacing $\Delta f$.

8. The method of claim 1, wherein the non-sinusoidal waveform is a square wave or a triangle wave.

9. The method of claim 1, wherein the non-sinusoidal waveform is composed of odd harmonic components, and/or the set comprises odd harmonic components of the non-sinusoidal waveform.

10. The method of claim 1, wherein at least one of the carriers is phase-modulated.

11. The method of claim 1, wherein the assigning comprises transmitting or receiving a control message that is indicative of the assignment.

12. A method of receiving data on carriers each using a non-sinusoidal waveform, the method comprising:
assigning a fundamental frequency to each of the carriers using the non-sinusoidal waveform, wherein baseband frequencies corresponding to a set of harmonic components of the non-sinusoidal waveform at each of the assigned fundamental frequencies are disjoint, wherein an energy of each of the harmonic components in the set is greater than a predefined threshold value; and
receiving modulation symbols representative of the data on at least one or all of the carriers.

13. The method of claim 12:
wherein the receiving the modulation symbols comprises sampling a received baseband signal with a sampling frequency; and
wherein the disjointness in the assignment of the fundamental frequencies is fulfilled considering baseband frequencies that differ by an integer multiple of the sampling frequency as equivalent.

14. The method of claim 13:
wherein the received baseband signal is decomposed into a plurality of orthogonal subcarriers with subcarrier spacing $\Delta f$; and
wherein each of the assigned fundamental frequencies and/or each of the baseband frequencies corresponds to one of the subcarriers.

15. The method of claim 12, wherein at least one of the carriers is phase-modulated.

16. The method of claim 13, wherein the receiving comprises demodulating a phase-modulated modulation symbol based on phase information received on both the assigned fundamental frequency of the corresponding carrier and at least one higher harmonic component in the set at the assigned fundamental frequency of the corresponding carrier.

17. The method of claim 16:
wherein the at least one higher harmonic component includes an i-th harmonic component from the set; and
wherein the phase modulation comprises M different constellations of the phase, wherein i and M are co-prime or incommensurable.

18. The method of claim 12, wherein the assigning comprises transmitting or receiving a control message that is indicative of the assignment.

19. A device for transmitting data on carriers each using a non-sinusoidal waveform, the device comprising:
processing circuitry;
memory containing instructions executable by the processing circuitry whereby the device is operative to:
assign a fundamental frequency to each of the carriers using the non-sinusoidal waveform, wherein baseband frequencies corresponding to a set of harmonic components of the non-sinusoidal waveform at each of the assigned fundamental frequencies are disjoint, wherein an energy of each of the harmonic components in the set is greater than a predefined threshold value; and
transmit modulation symbols representative of the data on at least one or all of the carriers.

20. A device for receiving data on carriers each using a non-sinusoidal waveform, the device comprising:
processing circuitry;
memory containing instructions executable by the processing circuitry whereby the device is operative to:
assign a fundamental frequency to each of the carriers using the non-sinusoidal waveform, wherein baseband frequencies corresponding to a set of harmonic components of the non-sinusoidal waveform at each of the assigned fundamental frequencies are disjoint, wherein an energy of each of the harmonic components in the set is greater than a predefined threshold value; and
receive modulation symbols representative of the data on at least one or all of the carriers.

* * * * *